US012654349B2

(12) United States Patent
Jin

(10) Patent No.: US 12,654,349 B2
(45) Date of Patent: Jun. 16, 2026

(54) MODEL FOR ACCOMMODATING MEAT, AND KITCHEN MEAT SLICER

(71) Applicant: Renhao Jin, Ningbo (CN)

(72) Inventor: Renhao Jin, Ningbo (CN)

( * ) Notice: Subject to any disclaimer, the term of this patent is extended or adjusted under 35 U.S.C. 154(b) by 0 days.

(21) Appl. No.: 19/011,204

(22) Filed: Jan. 6, 2025

(65) Prior Publication Data

US 2025/0135671 A1     May 1, 2025

Related U.S. Application Data

(63) Continuation of application No. PCT/CN2024/090023, filed on Apr. 26, 2024.

(30) Foreign Application Priority Data

Jul. 13, 2023   (CN) ........................ 202321844700.X
Jul. 13, 2023   (CN) ......................... 202321852848.8

(Continued)

(51) Int. Cl.
  B26B 29/06     (2006.01)
  A22C 17/00     (2006.01)
  B26B 3/04       (2006.01)

(52) U.S. Cl.
  CPC ........ B26B 29/063 (2013.01); A22C 17/0033 (2013.01); B26B 3/04 (2013.01)

(58) Field of Classification Search
  CPC ......... B26B 3/04; B26B 29/06; B26B 29/063; B26B 2029/066; B26D 2210/02; Y10S 83/932; A22C 17/0033

(Continued)

(56) References Cited

U.S. PATENT DOCUMENTS 1,736,238 A * 11/1929 Williams .............. B26B 29/063
                                                              D7/673
5,386,755 A *  2/1995 Schneider ............. B26B 29/063
                                                              D7/673

(Continued)

FOREIGN PATENT DOCUMENTS

CH         680057 A * 6/1992  ........... B26B 29/063
FR    2148947 A5 * 3/1973
GB    1094661 A    12/1967

OTHER PUBLICATIONS

English language translation of CH 680057 A5 to Thomi obtained from https://worldwide.espacenet.com/ on Feb. 27, 2025.*

(Continued)

*Primary Examiner* — Evan H MacFarlane
(74) *Attorney, Agent, or Firm* — ScienBiziP, P.C.

(57)                    ABSTRACT

A model for accommodating meat includes a placement cavity, each of two opposing side walls of the placement cavity are defined with a plurality of first blade grooves with upper end notches arranged side by side at intervals. The first blade grooves allow the blades to enter from their upper end notches. Two opposing first side surfaces of each first blade groove are inclined surfaces that approach a horizontal central line of this first blade groove from outside to inside, and a first spacing of the first blade groove decreases from outside to inside. The overall shape of each first blade groove is small inside and large outside. A kitchen meat slicer includes a model for accommodating meat and a blade set. The blade set includes a handle, a blade holder connected to the handle, and a plurality of blades arranged side by side at intervals.

11 Claims, 21 Drawing Sheets

(30)          Foreign Application Priority Data

Dec. 15, 2023    (CN) .......................... 202323428113.5
Dec. 25, 2023    (CN) .......................... 202323548641.4
Dec. 25, 2023    (CN) .......................... 202323559966.2

(58)  Field of Classification Search
      USPC .......................................................... 83/932
      See application file for complete search history.

(56)          References Cited

U.S. PATENT DOCUMENTS

| 5,653,154 | A | | 8/1997 | Liu et al. | |
|---|---|---|---|---|---|
| D635,409 | S | * | 4/2011 | Coffey | D7/674 |
| 2006/0090353 | A1 | * | 5/2006 | Sylvia | B26B 3/04 |
| | | | | | 30/305 |
| 2011/0232441 | A1 | * | 9/2011 | Aguirre | A47J 47/005 |
| | | | | | 83/35 |
| 2018/0154536 | A1 | * | 6/2018 | Repac | B26B 27/00 |

OTHER PUBLICATIONS

English language translation of FR-2148947-A5 to Freal obtained from https://worldwide.espacenet.com/ on Aug. 29, 2025.*

* cited by examiner

MODEL FOR ACCOMMODATING MEAT, AND KITCHEN MEAT SLICER

CROSS REFERENCE TO RELATED APPLICATIONS

This application is a Bypass Continuation of International Application No. PCT/CN2024/090023, filed Apr. 26, 2024, not in English, which claims priority to and the benefit of Chinese Patent Application No. 2023218528488, filed on Jul. 13, 2023; Chinese Patent Application No. 2023234281135, filed on Dec. 15, 2023; Chinese Patent Application No. 202321844700X, filed on Jul. 13, 2023; Chinese Patent Application No. 2023235599662, filed on Dec. 25, 2023; and Chinese Patent Application No. 2023235486414, filed on Dec. 25, 2023; the contents of which are incorporated herein by reference.

TECHNICAL FIELD

The present disclosure relates to a household food cutting tool, particularly, relates to a model of a kitchen meat slicer for accommodating meat, and the model can be used in conjunction with blades to slice or shred meat. It also relates to a kitchen meat slicer, which can quickly cut meat into slices or shreds.

BACKGROUND

As living standards improve, various meat slicing devices have been invented to achieve quick meat slicing. Generally, these devices have complex structures, are relatively large in size, and mostly motor-driven, making them inconvenient to operate and unsuitable for home use.

SUMMARY

A first aspect of the present disclosure is to provide a model for accommodating meat, including a placement cavity with an open top. Each of two opposing side walls of the placement cavity is provided with a plurality of first blade grooves spaced apart, each first blade groove has an upper end notch for receiving a corresponding blade, two opposing first side surfaces of each first blade groove are inclined surfaces approaching a horizontal central line of each first blade groove from outside to inside, and a first spacing of each first blade groove decreases from outside to inside.

A second aspect of the present disclosure is to provide a kitchen meat slicer including the aforementioned model for accommodating meat and a blade set. The blade set includes a handle, a blade holder connected to the handle, and a plurality of blades arranged side by side at intervals; a proximal end of each of the plurality of blades being fixed to the blade holder; a distal end of each of the plurality of blades being fixed to a connecting block; the handle being capable of driving the plurality of blades to slide back and forth for cutting; each of the plurality of blades being capable of entering a corresponding first blade groove from an upper end notch of the corresponding first blade groove and cutting meat placed in the placement cavity.

DETAILED WAY

The present disclosure is further described in detail below in conjunction with the embodiments of the accompanying drawings.

As shown in FIG. 1 to FIG. 19, a kitchen meat slicer of a preferred embodiment of the present disclosure is shown as follows.

Figure 8:
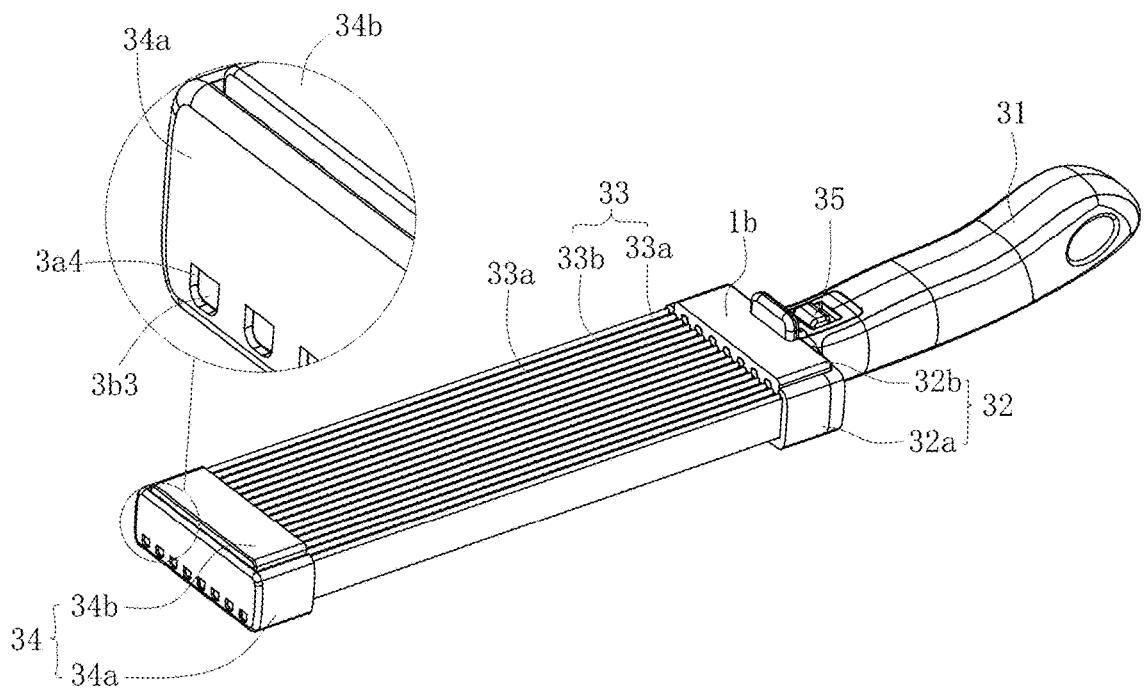
FIG. 8 is a perspective view of a blade set in accordance with the embodiments of the present disclosure.
Figure 9:
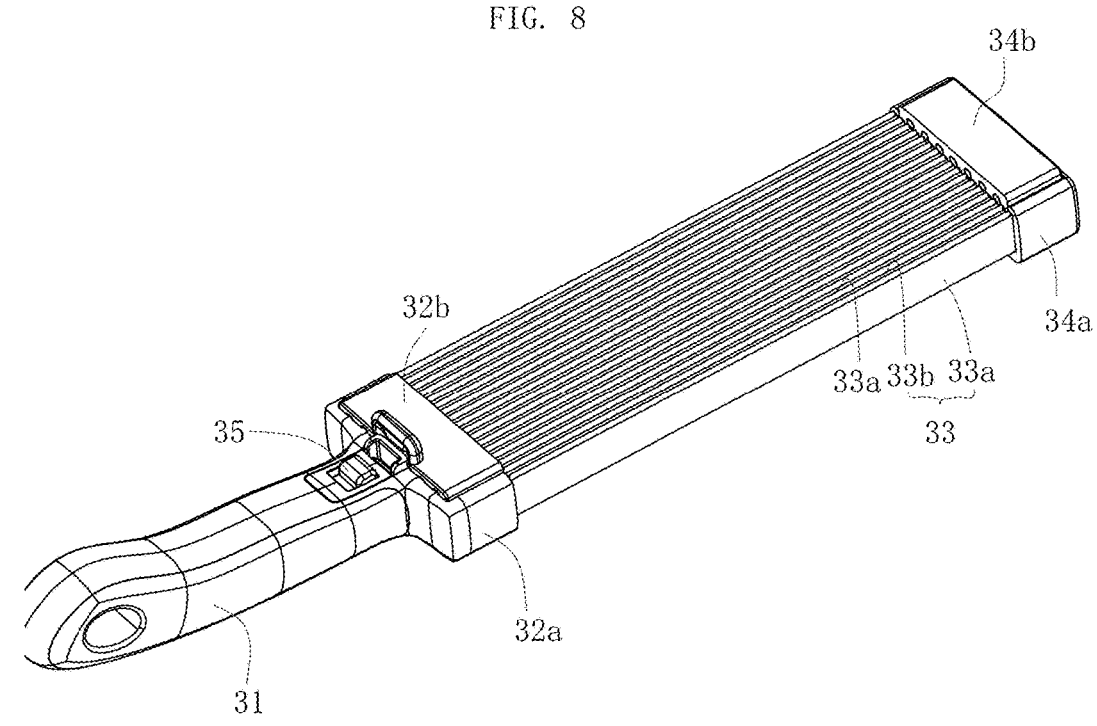
FIG. 9 is another perspective view of a blade set in accordance with the embodiments of the present disclosure.
Figure 10:
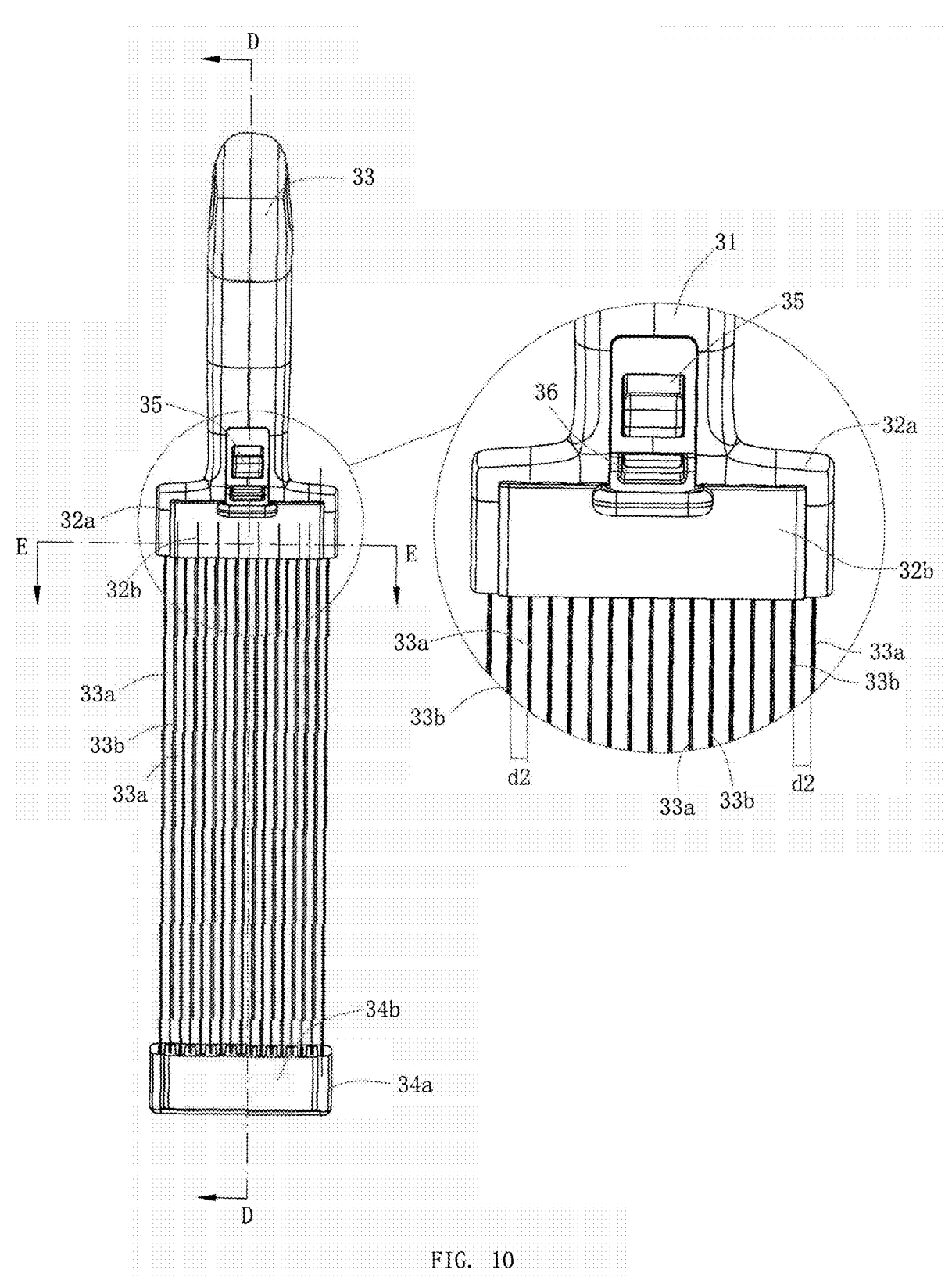
FIG. 10 is a top view of a blade set.

A meat slicer includes a model 1 for accommodating meat and a blade set 3 for cutting meat. The blade set 3 includes a handle 31, a blade holder 32 connected to the handle 31. A plurality of long strip-shaped blades 33 arranged side by side at intervals are arranged on the blade holder 32. A blade angle $\alpha$ of each blade 33 is ranged from 14 degrees to 22 degrees. As shown in FIG. 8, an optimal blade angle is 16 degrees. A thickness of each blade 33 is preferably ranged from 0.3 to 0.7 mm, with 0.5 mm as the optimal. A proximal end of each blade 33 is fixed to the blade holder 32, and a distal end of each blade 33 is fixed to a connecting block 34. During use, the handle 31 can drive each blade 33 to slide back and forth for cutting.

As shown in FIG. 9 to FIG. 15, the blade holder 32 includes a first blade holder 32a and a second blade holder 32b; the connecting block 34 includes a first connecting block 34a and a second connecting block 34b; each blade 33 includes a first blade 33a and a second blade 33b. A proximal end of each first blade 33a is fixed to the first blade holder 32a, and a distal end of each first blade 33a is fixed to the first connecting block 34a; a proximal end of each second blade 33b is fixed to the second blade holder 32b, and a distal end of each second blade 33b is fixed to the second connecting block 32b. The first blade holder 32a and the second blade holder 32b are inserted into each other, and the first connecting block 34a and the second connecting block 34b are inserted into each other. The first blade holder 32a has a first lower end surface 32a1 and a plurality of first upper ribs 32a2 extending upward from the first lower end surface 32a1, the first upper ribs 32a2 are arranged at intervals along a left-to-right direction, and the proximal end of each first blade 33a is fixed on a corresponding first upper rib 32a2. The second blade holder 32b has a first upper end surface 32b1 and a plurality of first lower ribs 32b2 extending downward from the first upper end surface 32b1, the first lower ribs 32b2 are arranged at intervals along a left-to-right direction, and the proximal end of each second blade 33b is fixed on a corresponding first lower rib 32b2. Each first lower rib 32b2 is inserted between two adjacent first upper ribs 32a2 to realize the insertion of the first tool holder 33a and the second tool holder 33b. A first spacing d1 is formed between two adjacent first blades 33a, and a second blade 33b is arranged in each first spacing d1; a second spacing d2 is formed between one second blade 33b and a first blade 33a adjacent to this second blade 33b. The first connecting block 34a has a second lower end surface 34a1 and a plurality of second upper ribs 34a2 extending upward from the second lower end surface 34a1, the second upper ribs 34a2 are arranged at intervals along a left-to-right direction, and the distal end of each first blade 33a is fixed on a corresponding second upper rib 34a2. The second connecting block 34b has a second upper end surface 34b1 and a plurality of second lower ribs 34b2 extending downward from the second upper end surface 34b1, the second lower ribs 34b2 are arranged at intervals along a left-to-right direction, and the distal end of each second blade 33b is fixed on a corresponding second lower rib 34b2. Each second upper rib 34a2 is inserted between two adjacent second lower ribs 34b2 to realize the insertion of the first connecting block 34a and the second connecting block 34b. The first connecting block 34a has an outer wall 34a3, which has defined with a plurality of holes 34a4. A front end of the second connecting block 34b has a plurality of posts 34b3. When the first connecting block 34a and the second connecting block 34b are inserted into each other, the posts 34b3 are inserted into the holes 34a4.

The blades of each first blade 33a and each second blade 33b are both arranged facing away from the first lower end surface 32a1 and the second lower end surface 34a1 respectively, and the handle 31 is fixed to the first blade holder 32a. Each first blade 33a is fixedly inserted to the first blade holder 32a and the first connecting block 34a, and each second blade 33b is fixedly inserted into the second blade holder 32b and the second connecting block 34b.

Figure 11:
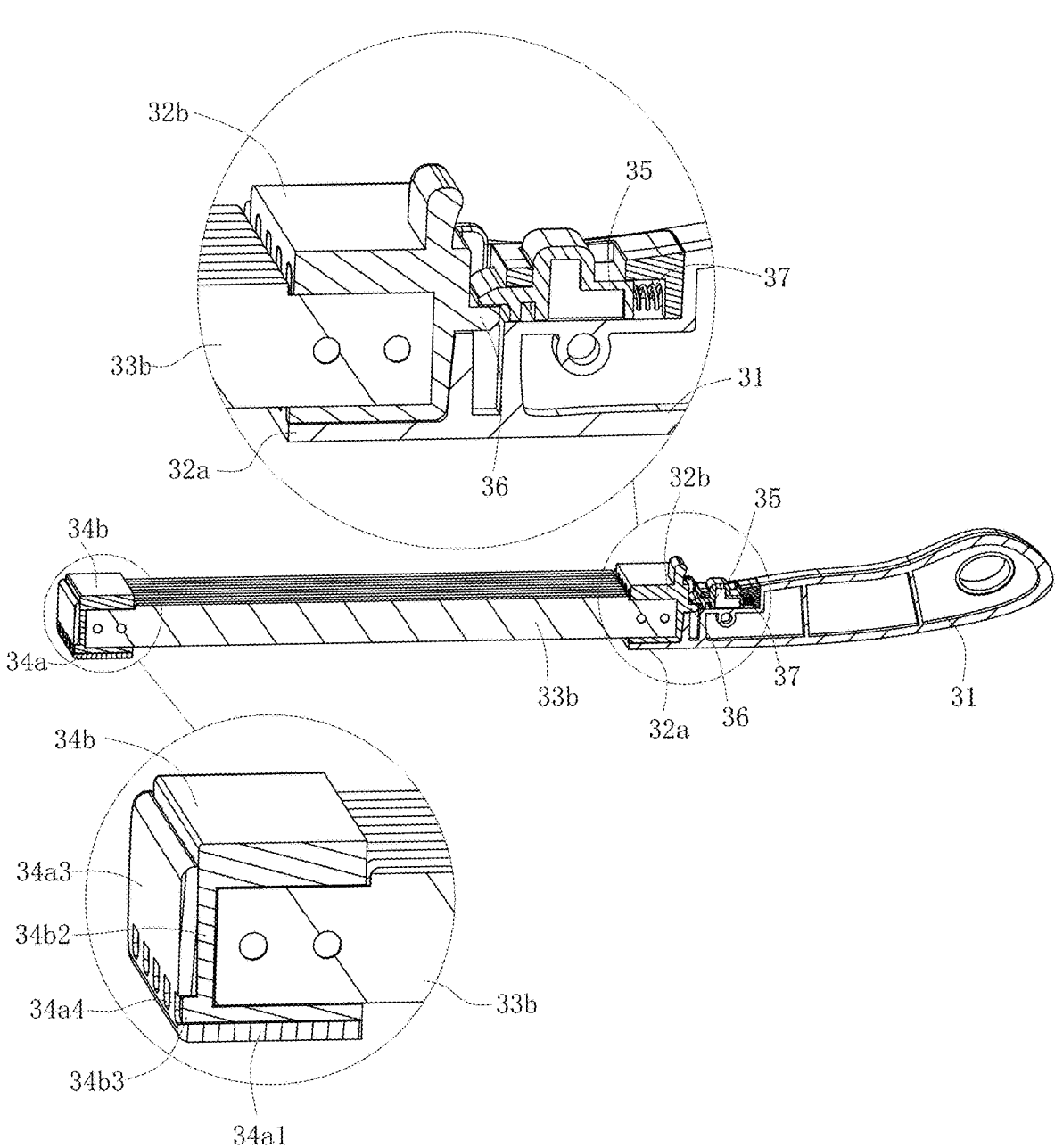
FIG. 11 is a perspective, cut away view of a blade set taken along line DD of FIG. 10.
Figure 12:
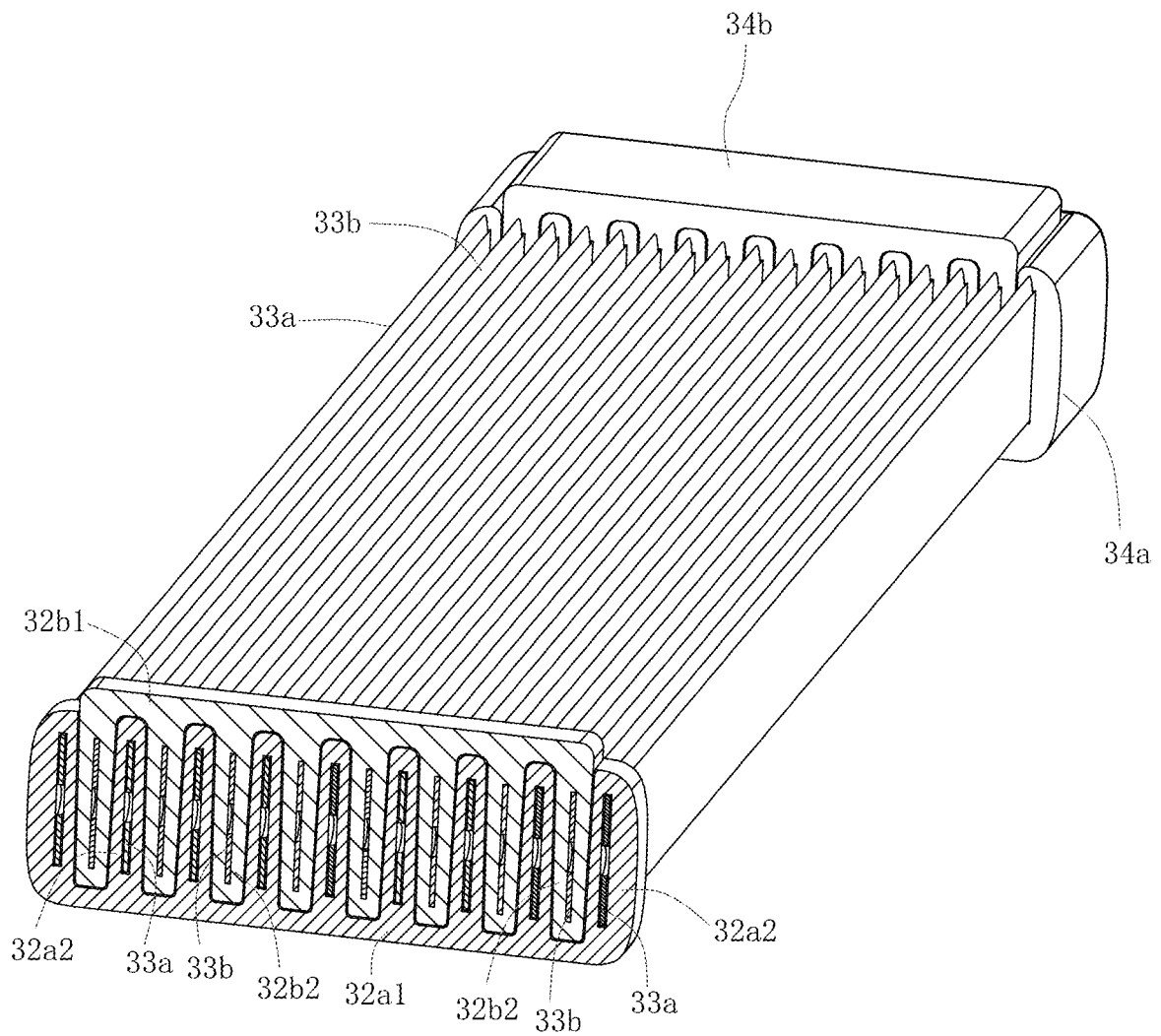
FIG. 12 is a perspective, cut away view of a blade set taken along line EE of FIG. 10.
Figure 13:
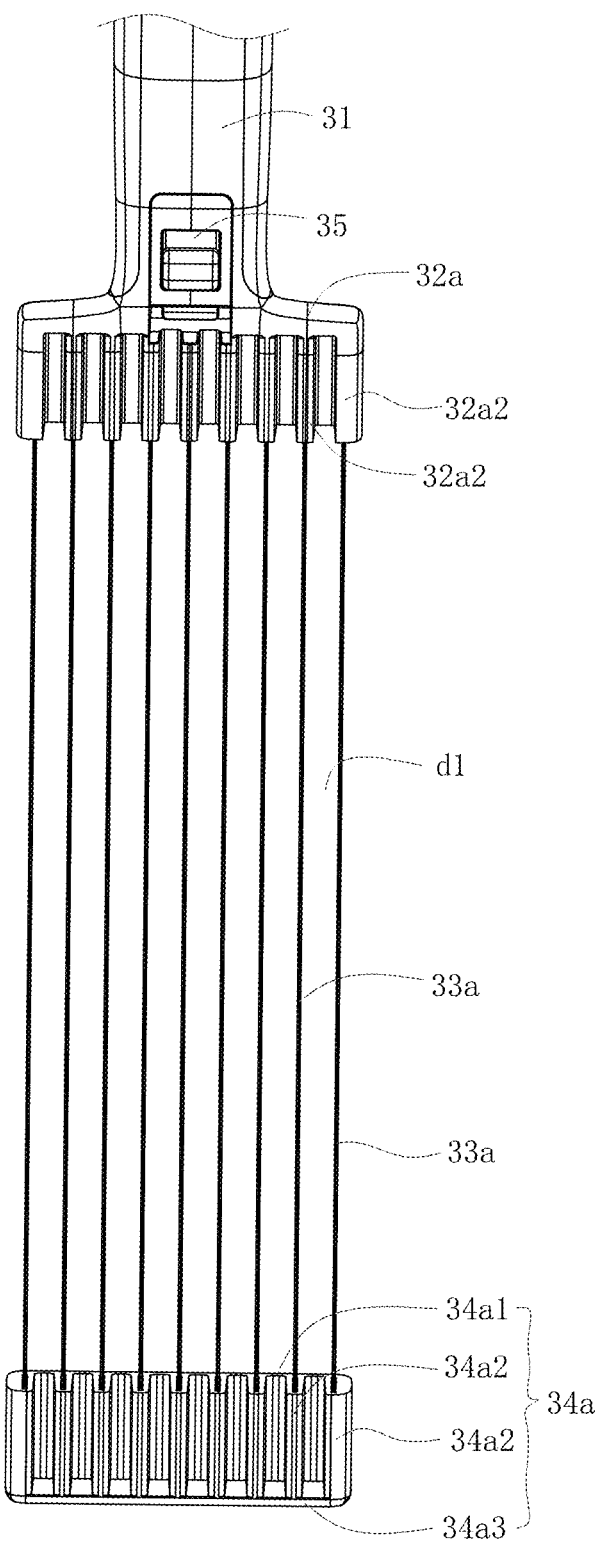
FIG. 13 is a top view of a blade set with second blades removed.
Figure 14:
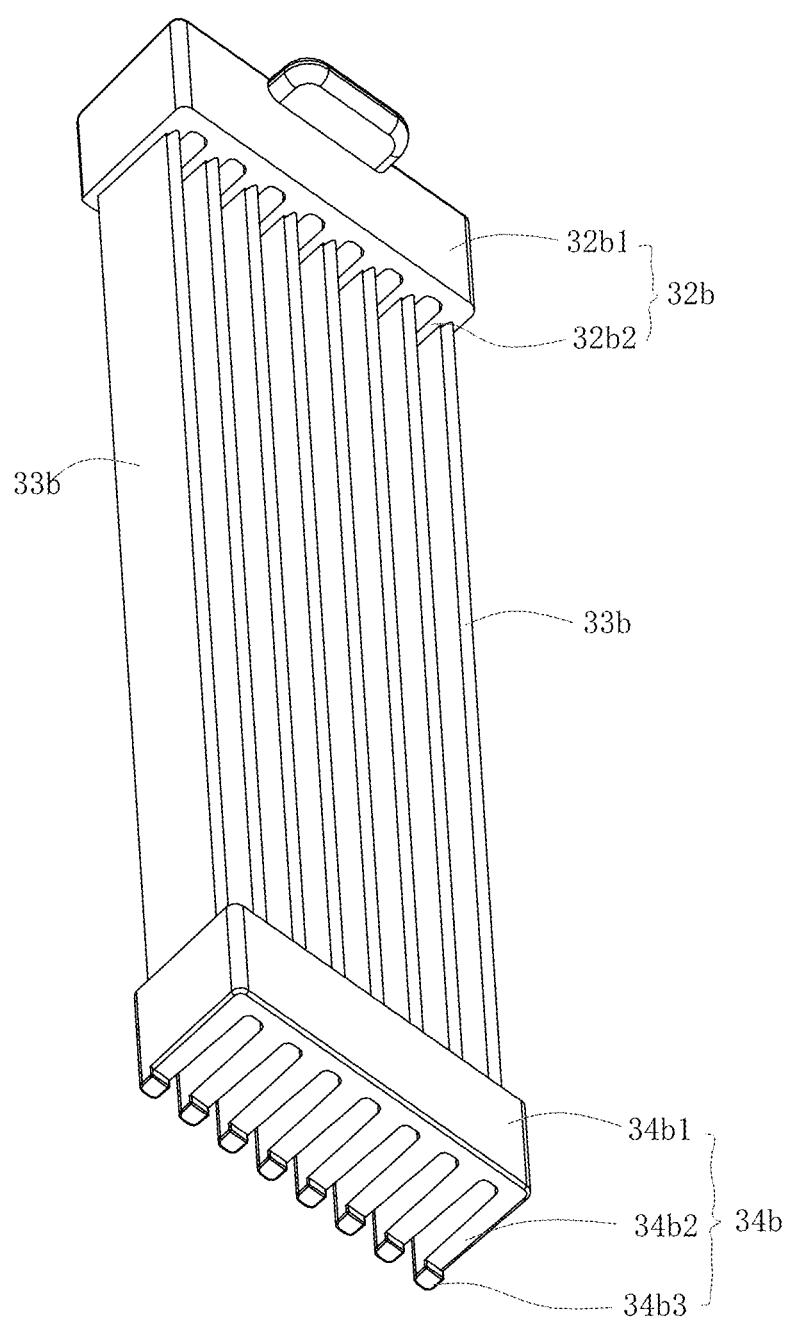
FIG. 14 is a perspective view of the second blades of a blade set.
Figure 15:
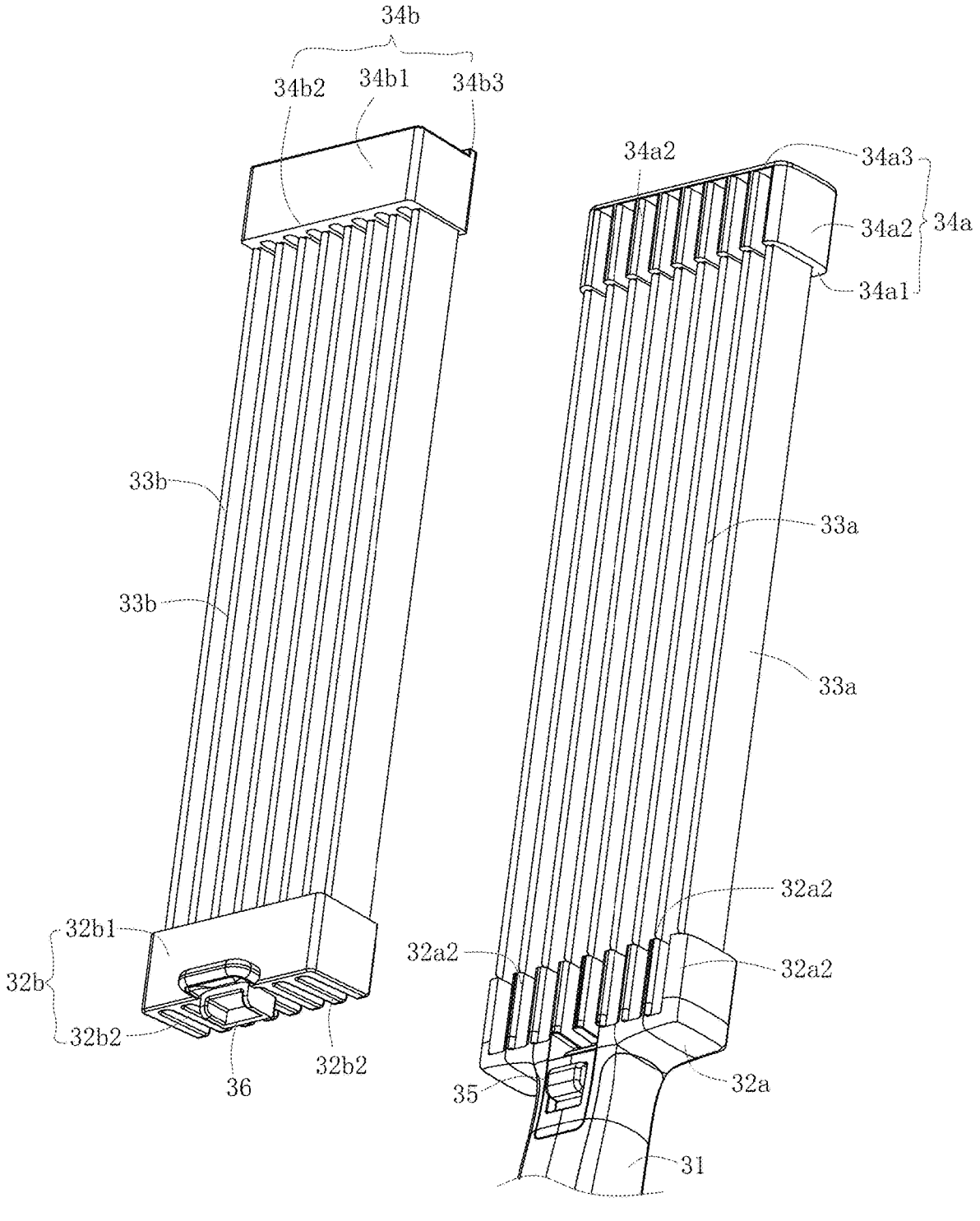
FIG. 15 is a perspective view of a blade set, with the second blades separated from the first blades.

As shown in FIG. 11, the first blade holder 32a and the second blade holder 32b are locked by a locking structure, which includes a locking block 35 restricted in the handle 31 and capable of sliding forward and backward along a longitudinal direction of the handle. The locking block 35 is maintained in a forward movement tendency under the force of a spring 37. The second blade holder 32b has a locking hook 36 configured to couple with the locking block 35. When the first blade holder 32a and the second blade holder 32b are mutually inserted into each other, the locking block 35 can move toward the locking hook 36, achieving the purpose of locking.

Figure 16:
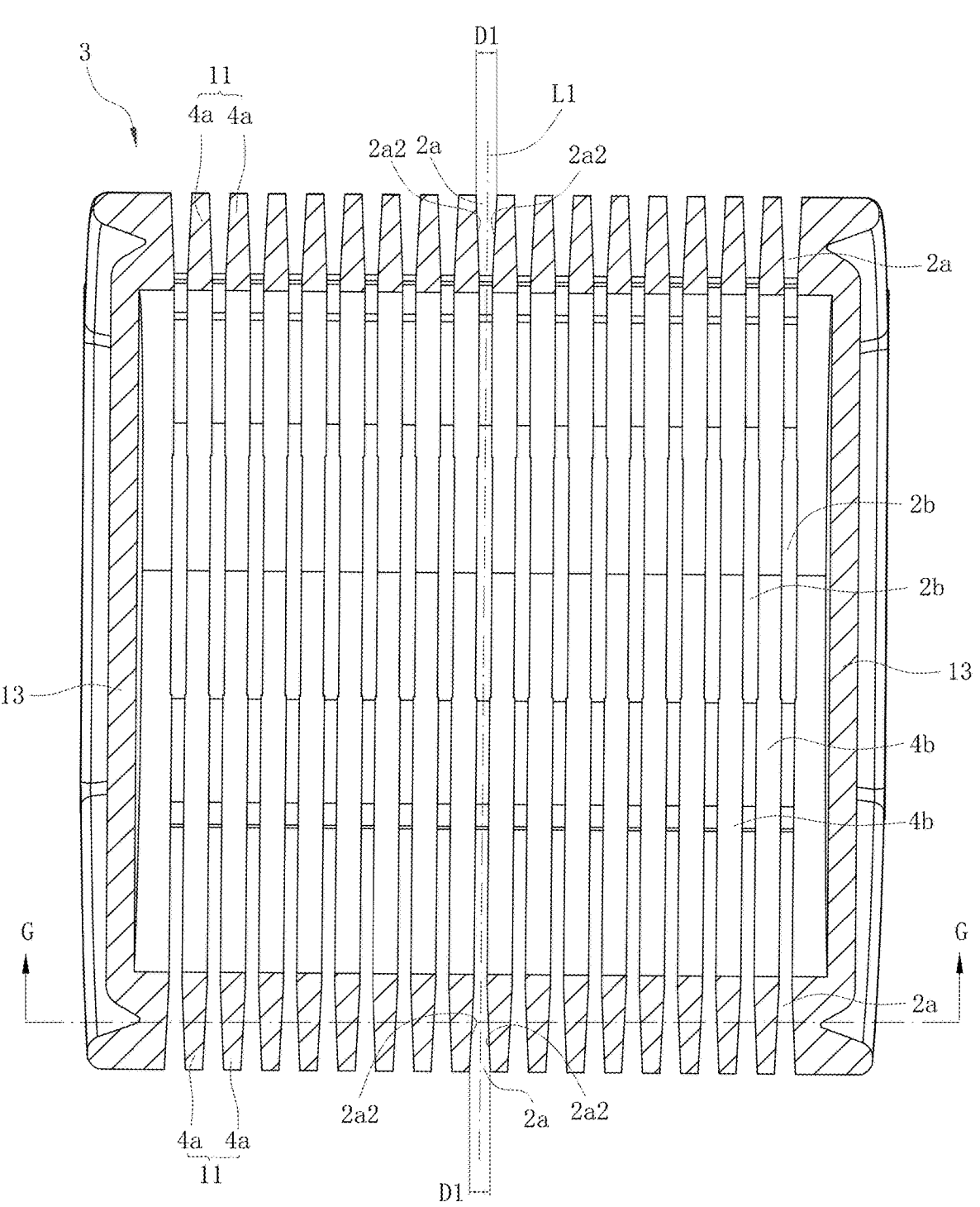
FIG. 16 is a top sectional view of a model taken along line AA of FIG. 6 in accordance with the embodiments of the present disclosure.

The model 1 of the present embodiment has a bottom 12, two side walls 11 opposingly arranged along a front-to-back direction, and two shielding walls 13 opposingly arranged along a left-to-right direction. The side walls 11, the bottom 12 and the shielding walls 13 are integrally formed. The bottom 12, the side walls 11 and the shielding walls 13 enclose a placement cavity Q with an open top. A bottom surface of the placement cavity Q is an arc-shaped, V-shaped or U-shaped concave surface Q1. Each of the two opposing side walls 11 of the placement cavity Q is provided with a plurality of first blade grooves 2a spaced apart from each other, each having an upper end notch 2a1. Each first blade groove 2a allows a blade 33 to enter from its upper end notch 2a1. As shown in FIG. 16, two opposing left and right first side surfaces 2a2 of each first blade groove 2a are inclined surfaces gradually approaching the horizontal central line L1 of the first blade groove 2a from outside to inside, allowing the first spacing D1 of the first blade groove 2a gradually decreases from outside to inside. From outside to inside refers to the direction from the outside of the placement cavity Q to the inside of the placement cavity Q.

Figure 7:
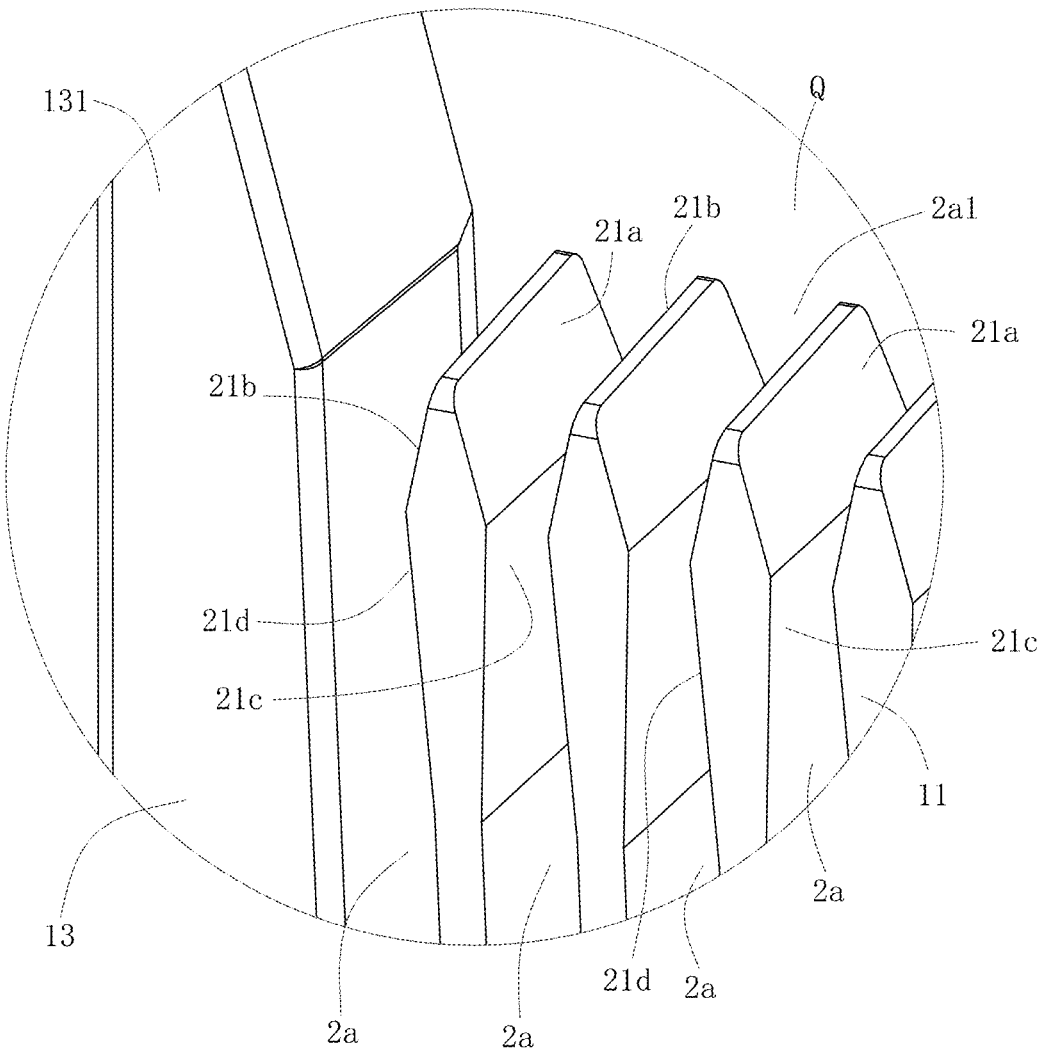
FIG. 7 is an enlarged view of area B of FIG. 6.
Figure 19:
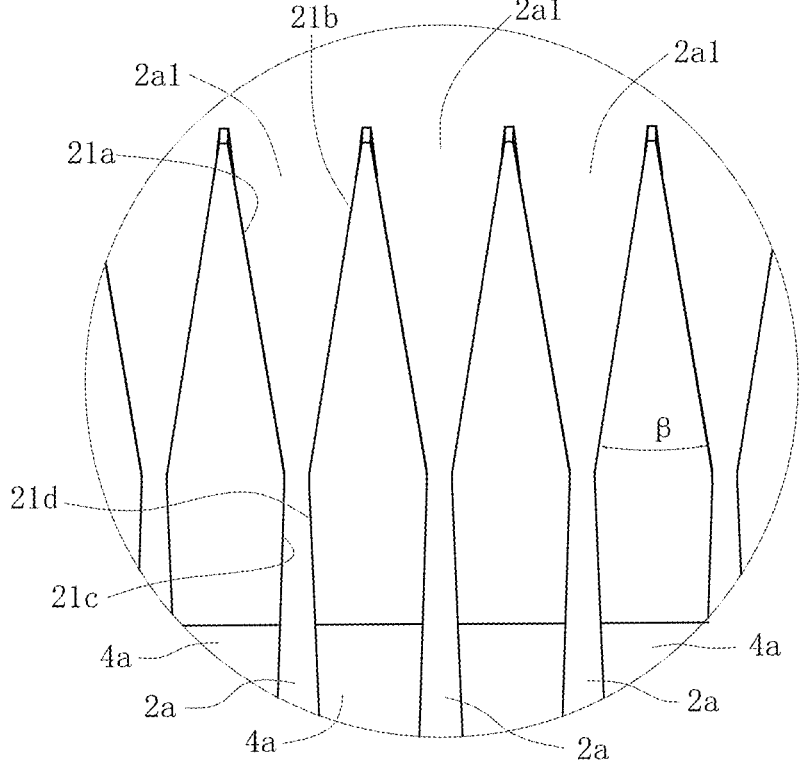
FIG. 19 is an enlarged view of area D in FIG. 17.

As shown in FIG. 7 and FIG. 19, a left wall of the upper end notch 2al of each first blade groove 2a has an upper left guiding bevel 21a inclined upward and leftward, and a right wall has an upper right guiding bevel 21b inclined upward and rightward. A bottom of each upper left guiding bevel 21a is connected to a lower left guiding bevel 21c inclined downward and leftward, and a bottom of each upper right guiding bevel 21b is connected to a lower right guiding bevel 21d inclined downward and rightward. As the first blade grooves are arranged side by side and spaced apart, a first partition between two adjacent first blade grooves is usually relatively thin. The first partitions may be deformed during use, resulting in a change of the first spacing of each first blade groove, making it difficult for the blades to align and enter the first blade grooves. Further improvement, a bottom of the above-mentioned upper left guiding bevel is connected to a lower left guiding bevel inclined which is inclined downward and leftward, and a bottom of each upper right guiding bevel is connected to a lower right guiding bevel which is inclined downward and rightward. The setting of the left and right lower guiding bevels enables both the left and right walls of each upper end notch to form a convex portion. When a groove wall of each first blade groove is biased and bent during use, the convex portion can make the adjacent groove walls abut and support each other. This prevents excessive deformation and displacement of the groove walls of the first blade grooves which otherwise may affect the blades from entering the first blade grooves. In addition, the setting of the lower guiding bevel forms an inverted V-shaped structure, which is convenient for the blade to move upward out of the first blade groove. When the model is manufactured by means of a one-time injection molding process, the advantages of this structure are obvious. If the groove walls of the first blade grooves are made of steel, there is no need to form a convex portion. As shown in FIG. 19, each side wall 11 includes a plurality of first partitions 4a vertically arranged side by side at intervals, and each first blade groove 2a is formed between two adjacent first partitions 4a, and a cross section of the first partition 4a gradually widens from outside to inside. A top of the first partition 4a has an inverted V-shaped sharp angle β, the sharp angle β ranges from 14 degrees to 22 degrees, and the optimal angle is 18 degrees. The first partitions can be independent components, which are fixedly arranged at intervals and spliced together to form the side walls and the first blade grooves. The first blade grooves can also be formed or spaced by the side walls, and each first partition is formed between two adjacent first blade grooves.

During use, each blade 33 can enter a corresponding first blade groove 2a from its upper end notch 2a1, and slide back and forth to cut the meat placed in the placement cavity Q. It is generally fresh meat or raw meat, instead of frozen meat.

Figure 17:
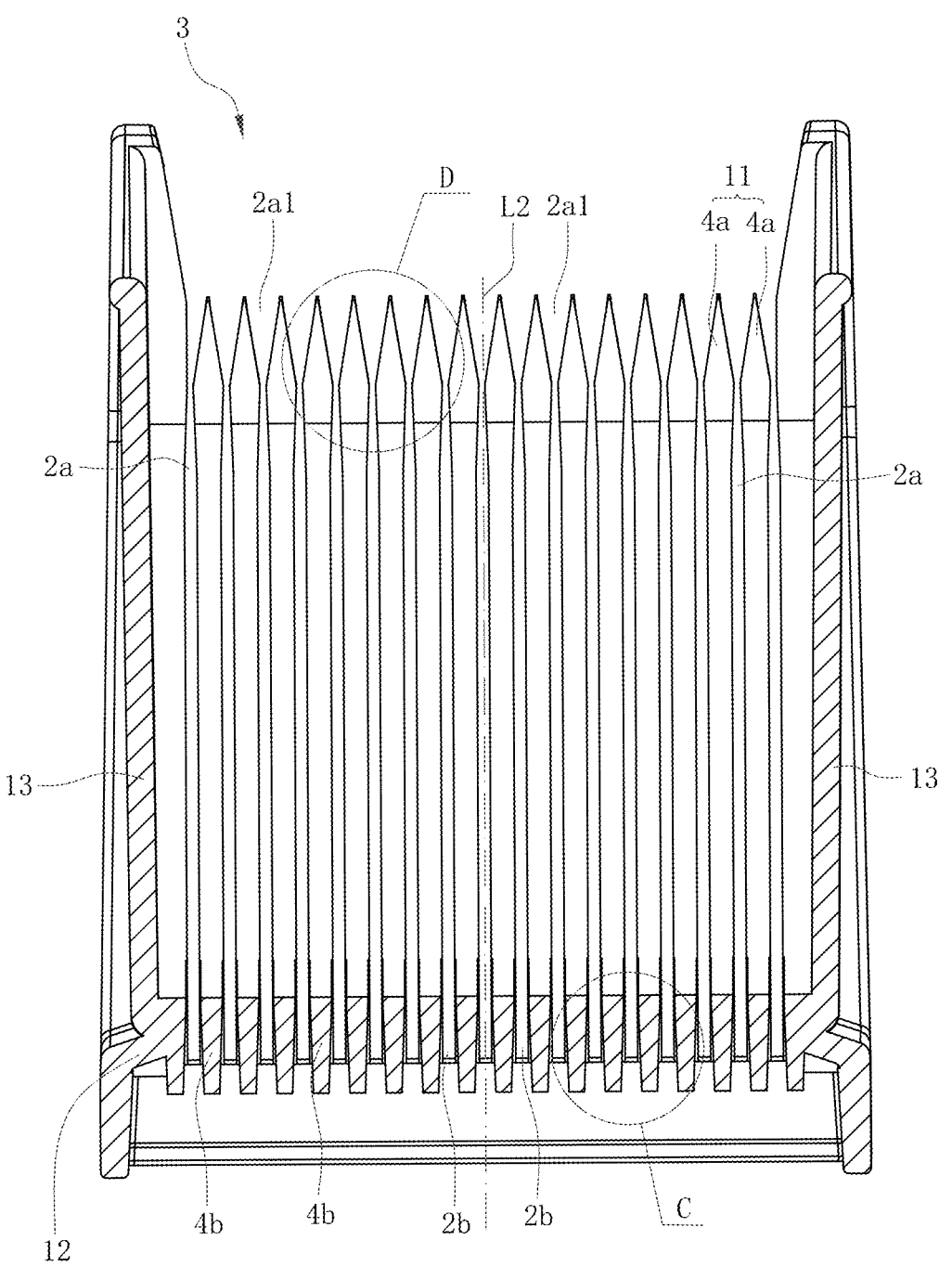
FIG. 17 is a front sectional view of a model taken along line FF of FIG. 6 in accordance with the embodiments of the present disclosure.
Figure 18:
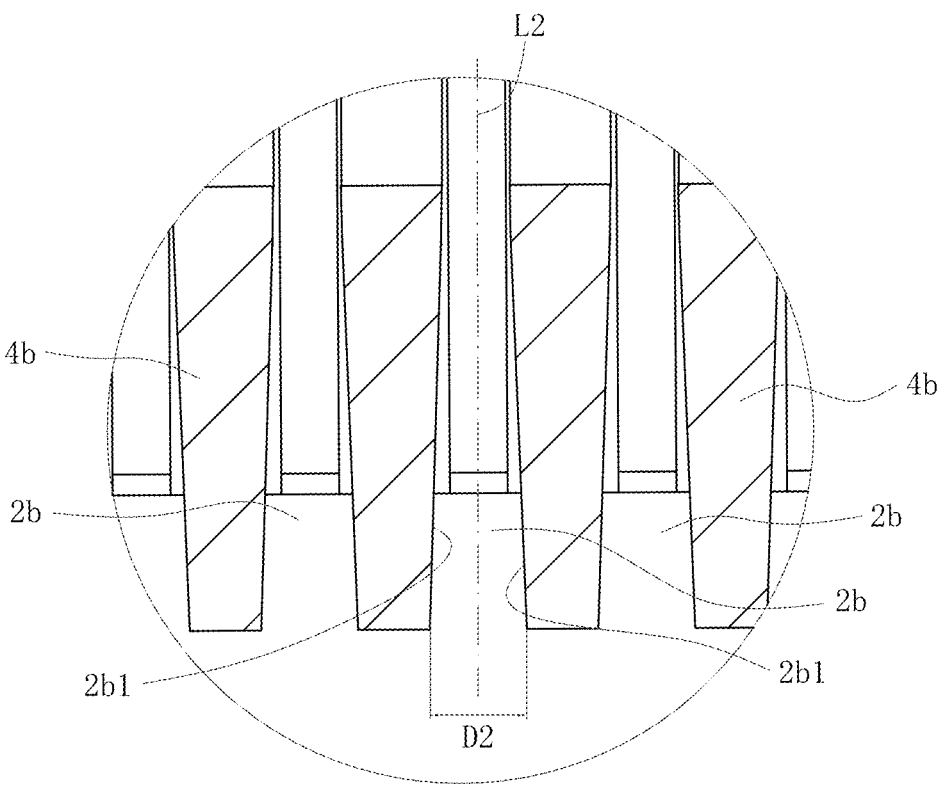
FIG. 18 is an enlarged view of area C in FIG. 17.

The bottom of the placement cavity Q is provided with a plurality of second blade grooves 2b arranged side by side at intervals. Each second blade groove 2b is arranged corresponding to a first blade groove 2a and in communication with each other and allows a blade 33 to be inserted. Each second blade grooves 2b runs through the bottom of the placement cavity Q perpendicularly, facilitating the cleaning of the meat slices in these second blade grooves 2b. As shown in FIG. 17 and FIG. 18, two opposing second side surfaces 2b1 of each second blade groove 2b are inclined surfaces gradually converging toward the vertical central line L2 of the second blade grooves 2b upwardly, causing a second distance D2 of the second blade groove 2b to gradually decrease upwardly. The bottom of the placement cavity Q has a plurality of second partitions 4b arranged side by side at intervals, a second blade groove 2b is formed between two adjacent second partitions 4b, and a cross section of each second partition 4b gradually widens upwardly. The second partitions 4b can be an independent component, which are arranged at intervals and fixed together to form the side walls. They can also be second partitions formed or spaced by the side walls, and each second partition is formed between two adjacent second blade grooves.

Compared with the related art, the advantages of the model for accommodating meat are as follows.

1. The model can be a part of the meat slicer and can cooperate with the blade set to easily and efficiently cut the meat into slices or shreds. When cutting meat, put the meat into the placement cavity, and the plurality of blades of the blade set can enter each first blade grooves to cut the meat in the placement cavity, which is extremely efficient. The top of the placement cavity is open, facilitating the placement and removal of meat.

2. The two opposing first side surfaces of each first blade groove are inclined surfaces that gradually approach the horizontal central line of each first blade groove from outside to inside, the first spacing of each first blade groove decreases from outside to inside, and the overall shape of each first blade groove is small inside and large outside. In this way, during the process of cutting meat, the meat inside the placement cavity is not easy to get stuck in the first blade grooves which otherwise creates a sharp increase in the resistance of the blades to slide back and forth. Therefore, the reduced blade resistance makes it easy and labor-saving when cutting meat.

3. The first spacing of each first blade groove decreases from outside to inside, and the overall shape of each first blade groove is small inside and large outside, so that the contact and friction between each blade and the outer groove wall of the first blade groove can be significantly reduced during the meat cutting process, making a labor-saving operation. The first spacing of each first blade groove decreases from outside to inside, making it difficult for each blade to wobble in the first blade groove, and giving a neat cut and a consistent thickness. It is also convenient to clean. When rinsing from outside to inside, water flows into the inside of the placement cavity, creating a trumpet-shaped channel with a wide outer and narrow inner stream. The water flow provides a strong impact force, which conveniently removes residual meat scraps.

The present disclosure also provides a base 5, and a suction cup 6 for adhering to the table is provided at a bottom of the base 5. The suction cup 6 is controlled by a suction cup knob 61, which is configured to check whether it is securely adhered or not. When the suction cup 6 is adhered to the table, the suction cup knob 61 can prevent the model 1 from being detached from the base 5. The suction cup knob 61 has a circular central portion and an extension, and the central portion is connected to a rotating shaft. When the suction cup 6 is adhered to the table, the extension of the suction cup knob 61 stands up to prevent the model 1 from being detached from the base 5. The model 1 is detachably mounted on the base 5. A top of the base 5 is defined with a slot 51 extending in a left-to-right direction, and an insert 121 is provided at the bottom of the model 1. The insert 121 can be inserted into the slot 51 to secure the model 1 on the base 5.

Figure 1:
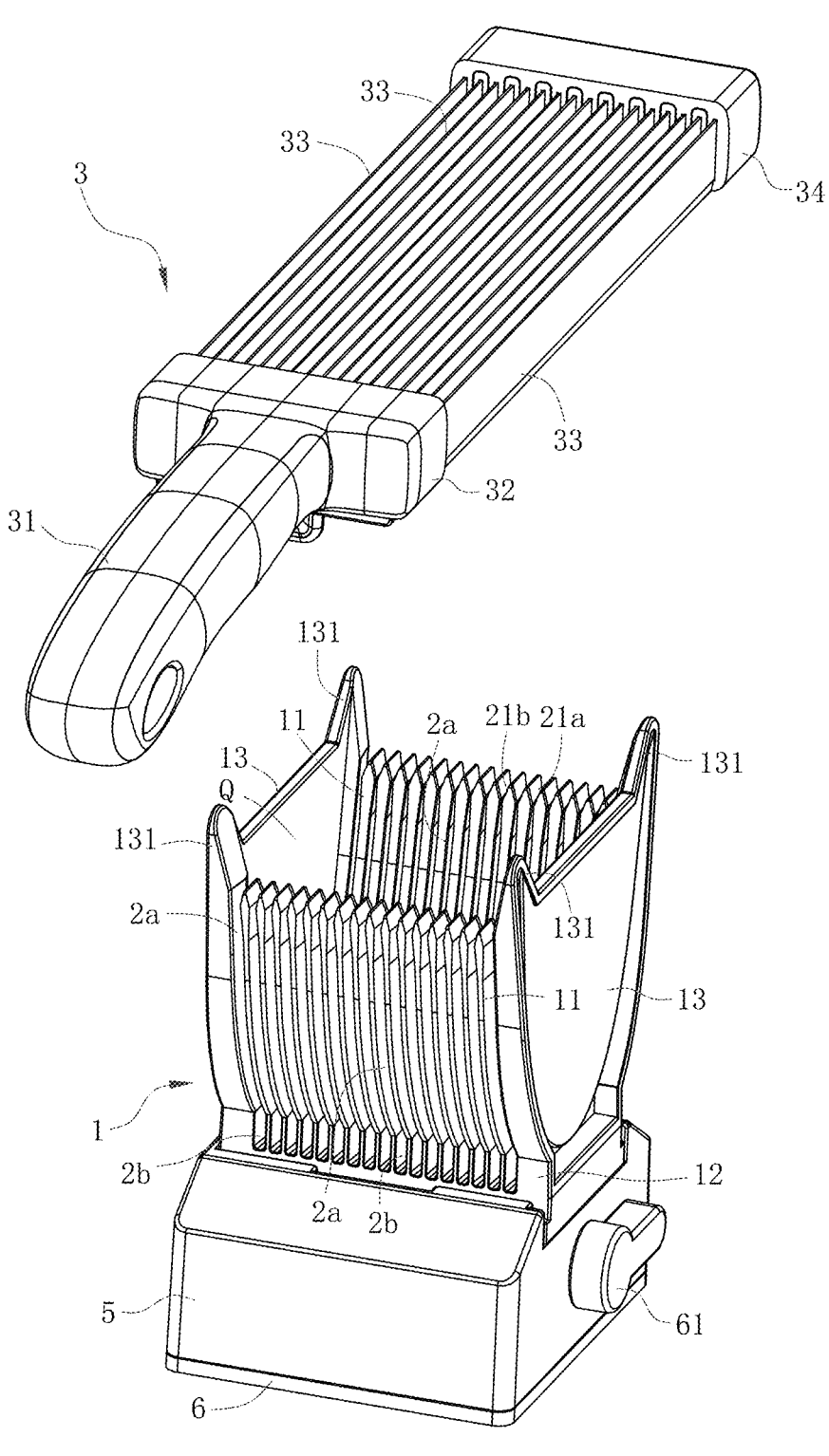
FIG. 1 is a perspective view in accordance with the embodiments of the present disclosure.
Figure 2:
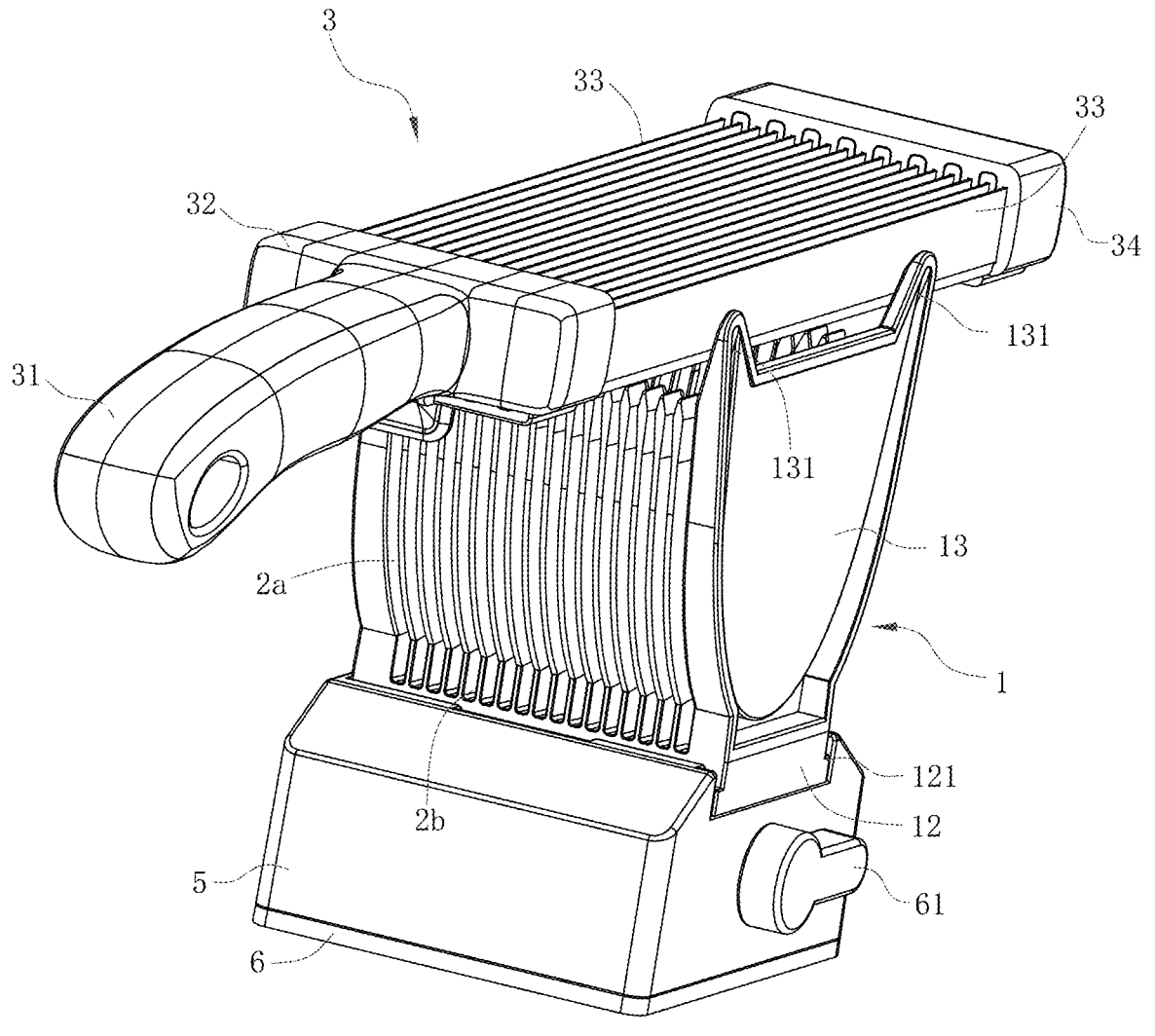
FIG. 2 is a perspective view of a blade set placed on a model in accordance with the embodiments of the present disclosure.
Figure 3:
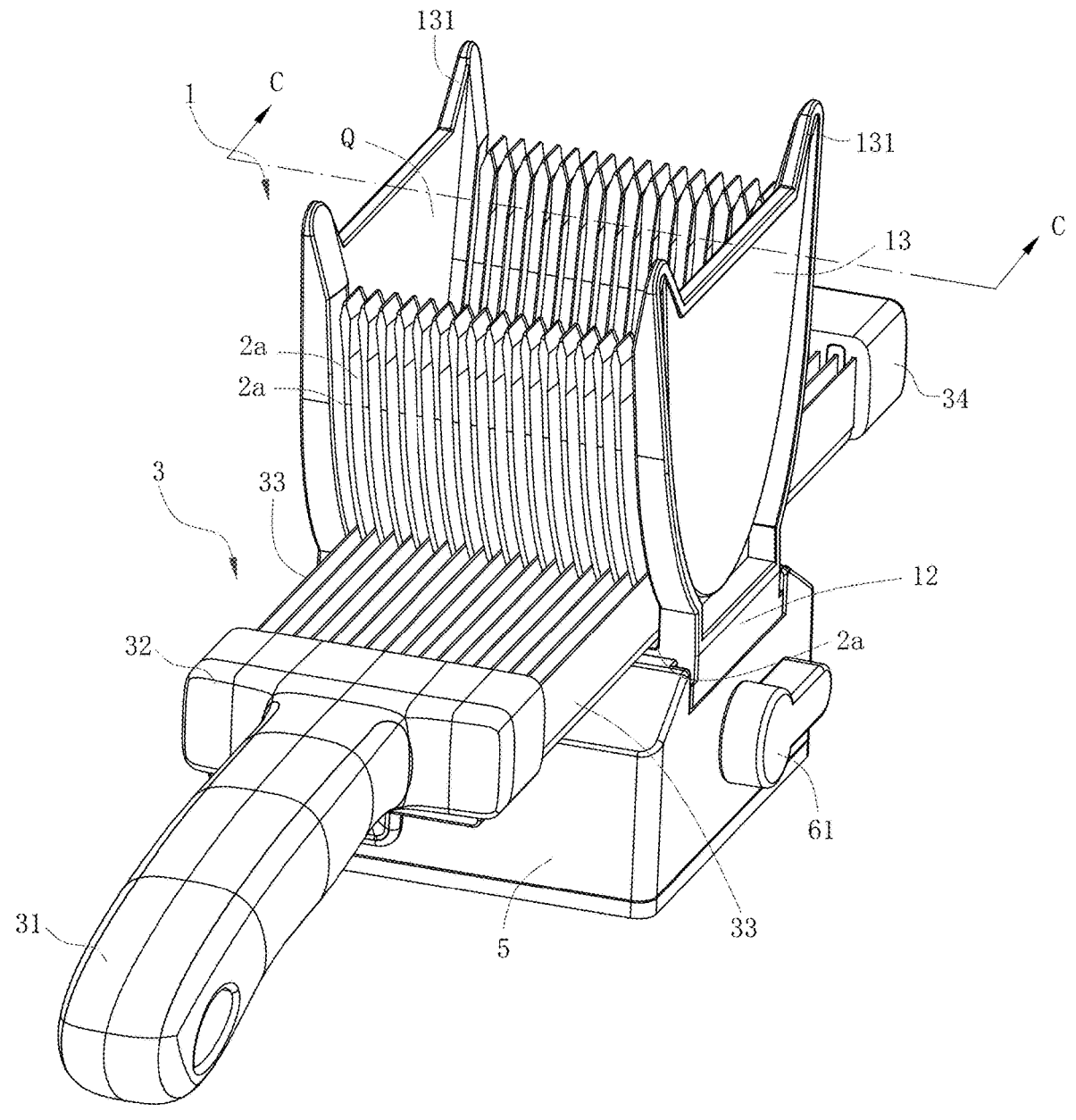
FIG. 3 is a perspective view of a blade set entering the second blade grooves at the bottom of the placement cavity of the model from the first blade grooves in accordance with the embodiments of the present disclosure.
Figure 4:
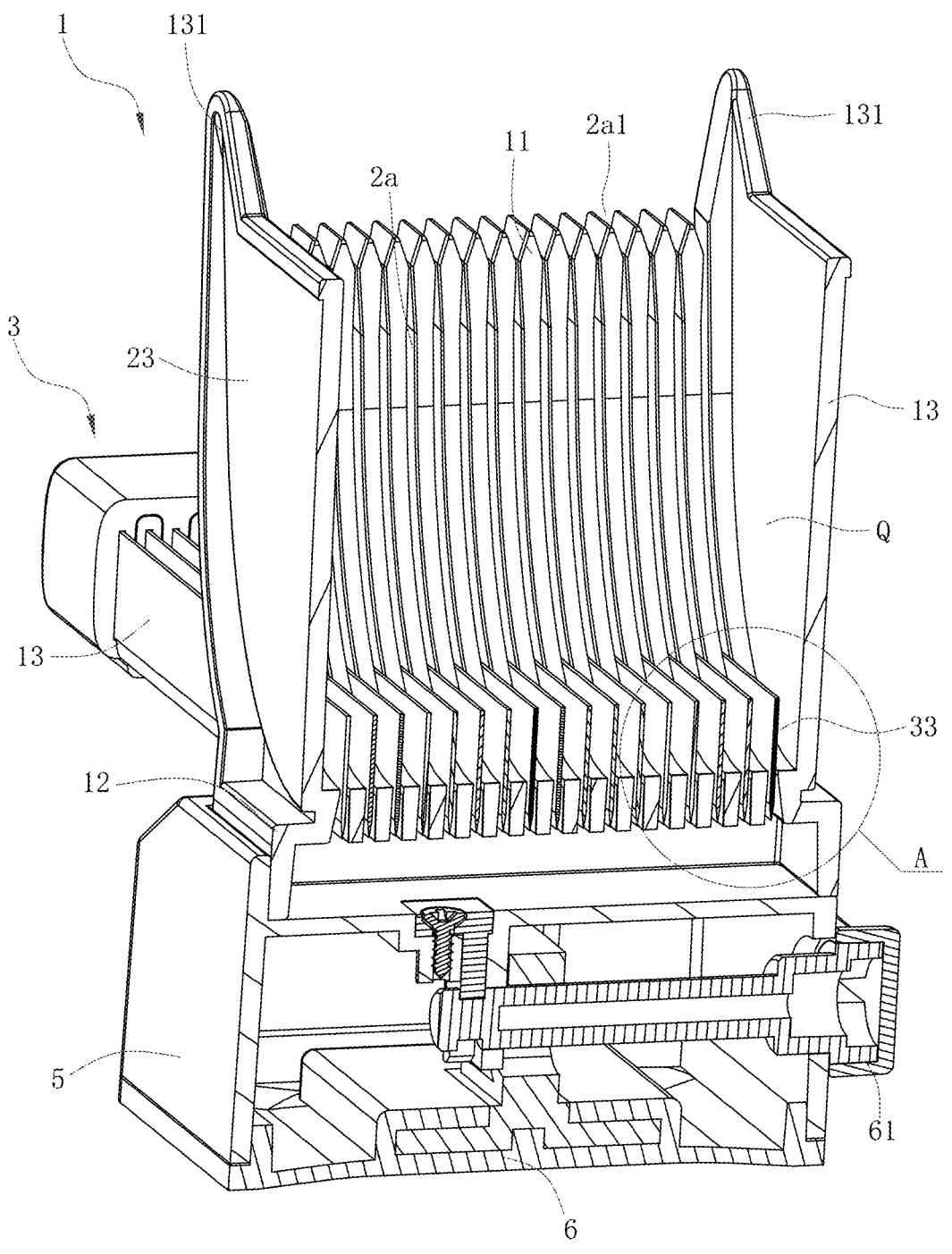
FIG. 4 is a sectional view taken along line CC of FIG. 3.
Figure 5:
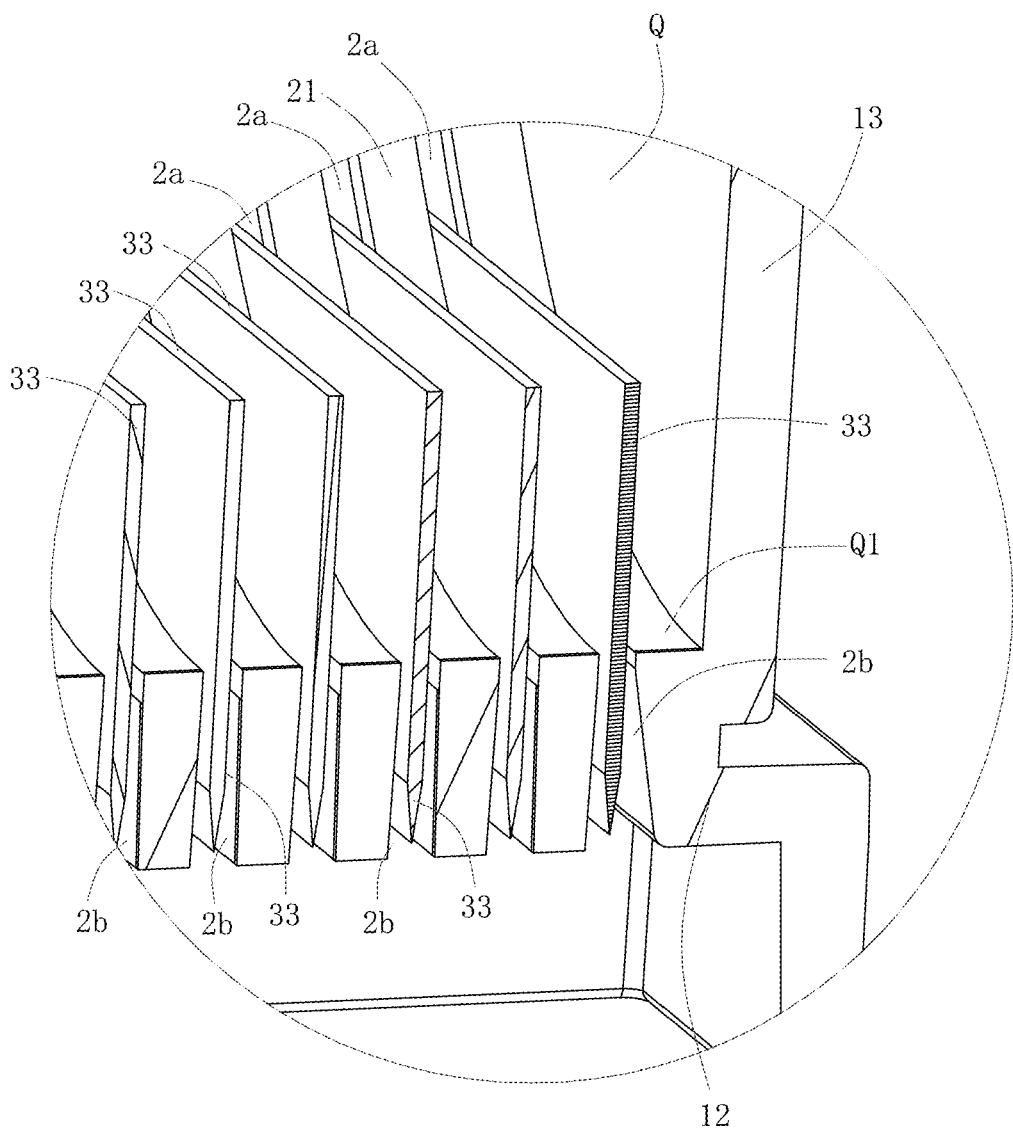
FIG. 5 is an enlarged view of area A of FIG. 4.
Figure 6:
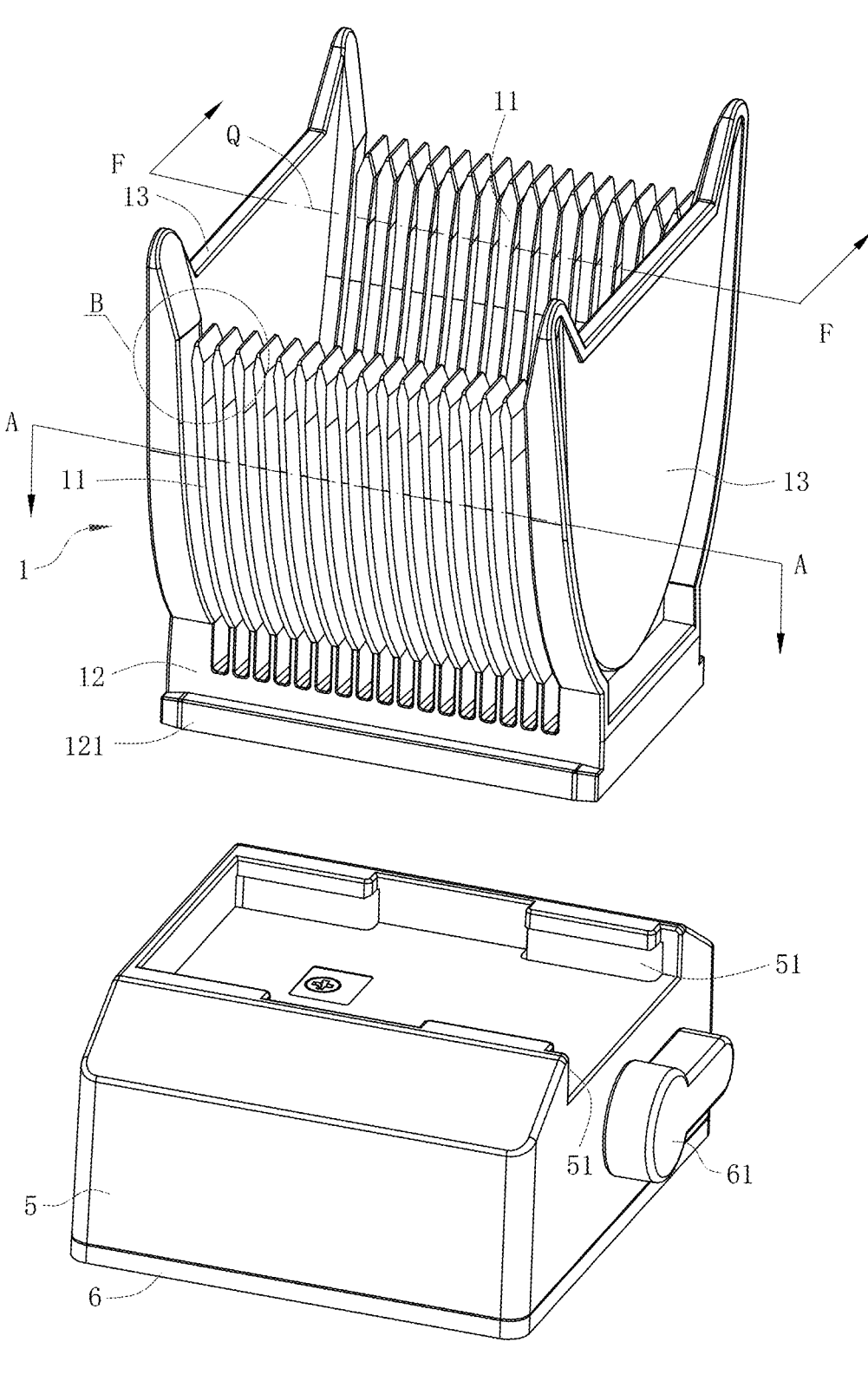
FIG. 6 is a perspective view of a model and a base in accordance with the embodiments of the present disclosure.

As shown in FIG. 1 to FIG. 3, the working principle and process of the kitchen meat slicer are as follows.

Put the insert 121 of the model 1 into the slot 51 of the base 5 along a left-to-right direction to complete the installation of the model 1 on the base 5. Then, rotate the suction cup knob 61 to control the suction cup 6 to adhere to the table, allowing the extension of the suction cup knob 6 to be upright to prevent the model 1 from being detached from the base 5 laterally.

When slicing meat, put the fresh meat into the placement cavity Q from the open top of the placement cavity Q, hold the handle 31 of the blade set 3, and then put the plurality of blades 33 of the blade set 3 into the corresponding first blade grooves 2a, and press down. When the blades 33 contacts the meat, press down and slide the blade set 3 back and forth, easily cutting the meat into slices of uniform thickness (the thickness of the meat slice is equal to the spacing between the blades). This allows the meat to be cut into slices at one time. The bottom of the placement cavity Q is provided with a plurality of second blade grooves 2b, each in communication with a corresponding first blade groove 2a. When the blades 33 of the blade set 3 moves to the bottom of the placement cavity Q, the blades 33 continue to cut downward into the second blade grooves 2b below the bottom surface of the placement cavity Q, allowing the meat placed in the placement cavity Q to be cut. A depth of the second blade groove 2b is preferably greater than or equal to a height of each blade 33, allowing each blade 33 after cutting the meat to be located below the bottom surface of the placement cavity Q. When the blade set 3 moves upward, the top surface of each blade 33 pushes the cut meat upward together, which is convenient for the user to take out the meat while moving the blade set 3 upward.

After the fresh meat is cut into slices, stack them vertically, and place them in the placement cavity Q through the open top. Hold the blade set 3 by hand and re-enter the meat into placement cavity Q to cut the slices into shreds, allowing consumers to freely choose the shape of the food.

The first spacing of the first blade groove 2a gradually decreases from outside to inside. The overall shape of the first blade groove 2a is small inside and large outside, and the overall shape of the second blade groove 2b is small on the top and large on the bottom. The meat tends to not easily be stuck in the first blade grooves 2*a* from the placement cavity Q, nor is it easy to be stuck in the second blade grooves 2*b* from the placement cavity Q. The blades 33 moves back and forth in the first blade grooves 2*a* and the second blade grooves 2*b* with less stagnation and less friction, which is more labor-saving. The blades 33 do not easily wobble within the first blade grooves 2*a*, resulting in more uniform meat slices with consistent thickness. The cleaning is easy, rinsing from outside to inside creates a trumpet-shaped water flow with a wide outer and narrow inner stream, providing strong pressure that effectively removes residual meat scraps.

Figure 20:
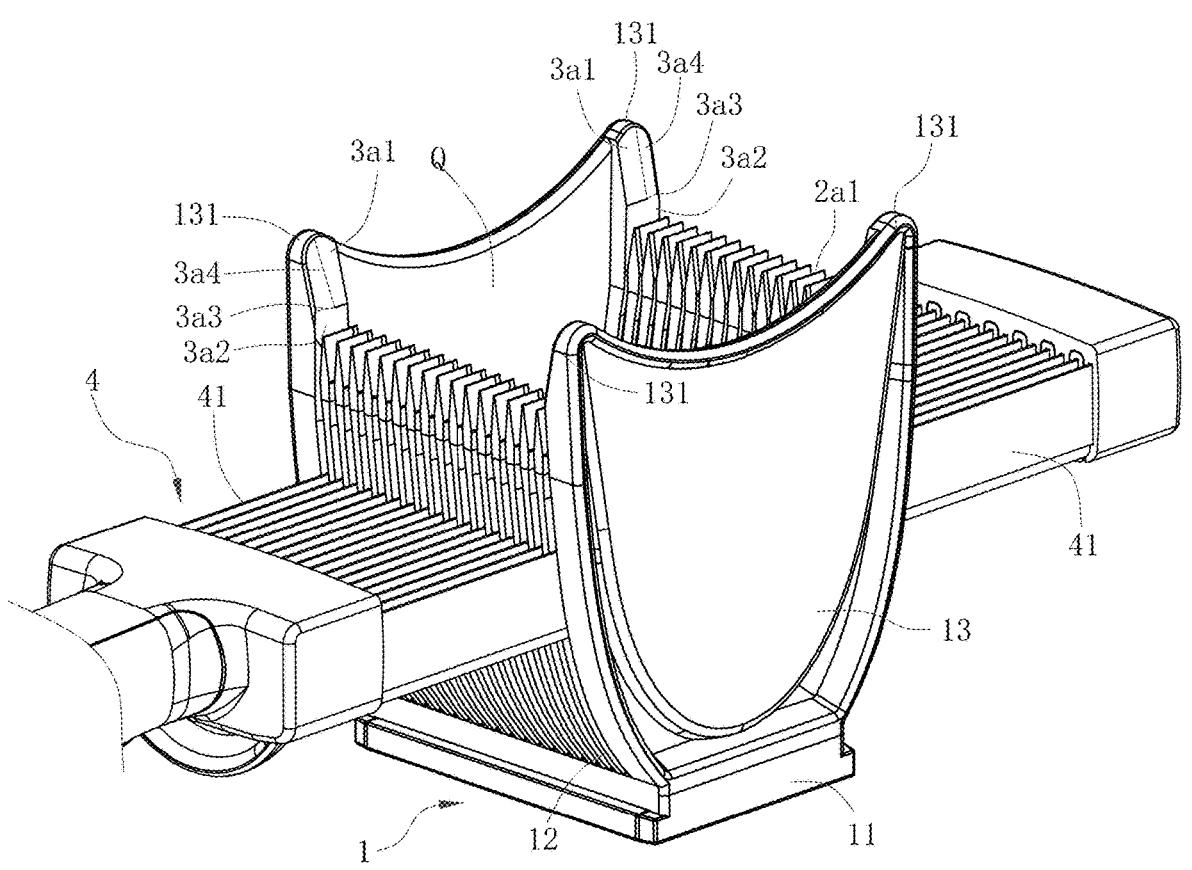
FIG. 20 is a perspective view of a second improved model in accordance with the embodiments of the present disclosure.

As shown in FIG. 20, the model 1 has a second improved structure.

Each of left and right sides of each shielding walls 13 above the open top of the placement cavity Q is provided with a guiding wall 131. A side of the guiding wall 131 facing the first blade groove 3*a* has a guiding bevel 3*a*1 and a vertical guiding bevel 3*a*2. The vertical guiding bevel 3*a*2 is located below the guiding bevel 3*a*1. An intersection line 3*a*3 of the guiding bevel 3*a*1 and the vertical guiding bevel 3*a*2 is located above the upper end notches 3 of the first blade grooves 3*a*. An outer side of the guiding bevel 3*a*1 has an outer bevel 3*a*4 inclined outward.

When cutting meat, the outermost blades 31 on the left and right sides of the blade set 3 are guided by the guiding bevel 3*a*1 to gradually slide into the open top of the placement cavity Q. However, instead of sliding directly into the first blade groove 3*a*, they are first transitioned and adjusted via the vertical guiding bevel 3*a*2 below the guiding bevel 3*a*1. This adjusts the (referring to the outermost blades 33 on the left and right sides of the blade set 3) sliding from a inclined direction to a vertical direction before continuing into the first blade grooves 3*a*. Additionally, this prevents the outermost blades 33 on the left and right sides of the blade set 3 directly sliding into the first blade grooves 3*a* along the inclined direction of the guiding bevel 3*a*1, avoiding damage to the groove wall of the first blade groove 3*a* caused by the outermost blades 33 of the blade set 3 and preventing a jamming phenomenon, ensuring smoother operation. During use, users often inadvertently tilt the blade set 3, i.e., slightly tilt sidewards, resulting the blades 33 not to be aligned with the first blade grooves 3*a*. However, as the outer side of the guiding bevel 3*a*1 has an outer outwardly inclined bevel 3*a*4, even if the blade set 3 tilts slightly to the left and right directions when entering the first blade grooves 3*a*, the outermost blades 33 of the blade set may not cut the outer side of the guiding bevel 3*a*1. This ensures smoother insertion and prevents damage to the blades and guiding walls.

Figure 21:
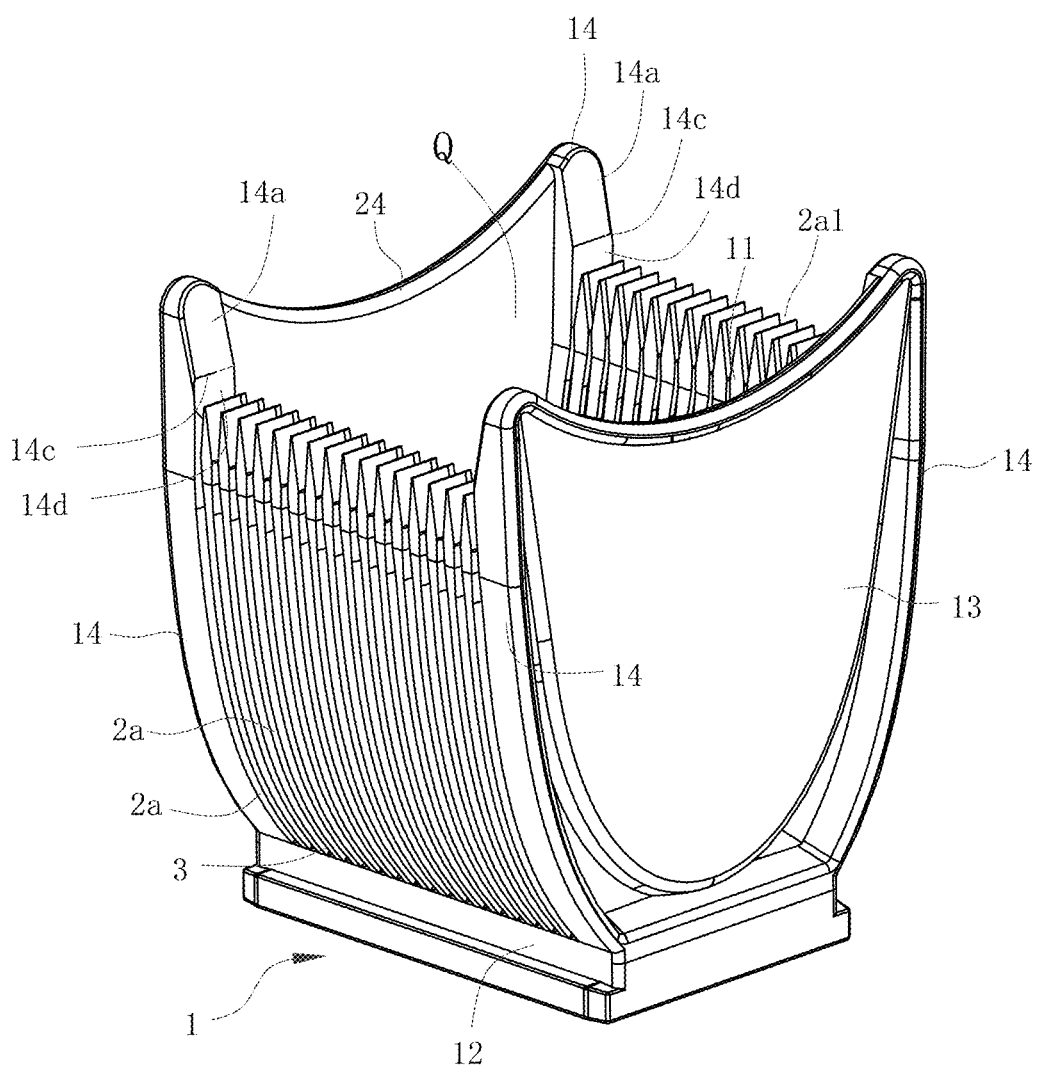
FIG. 21 is a perspective view of a third improved model in accordance with the embodiments of the present disclosure.
Figure 22:
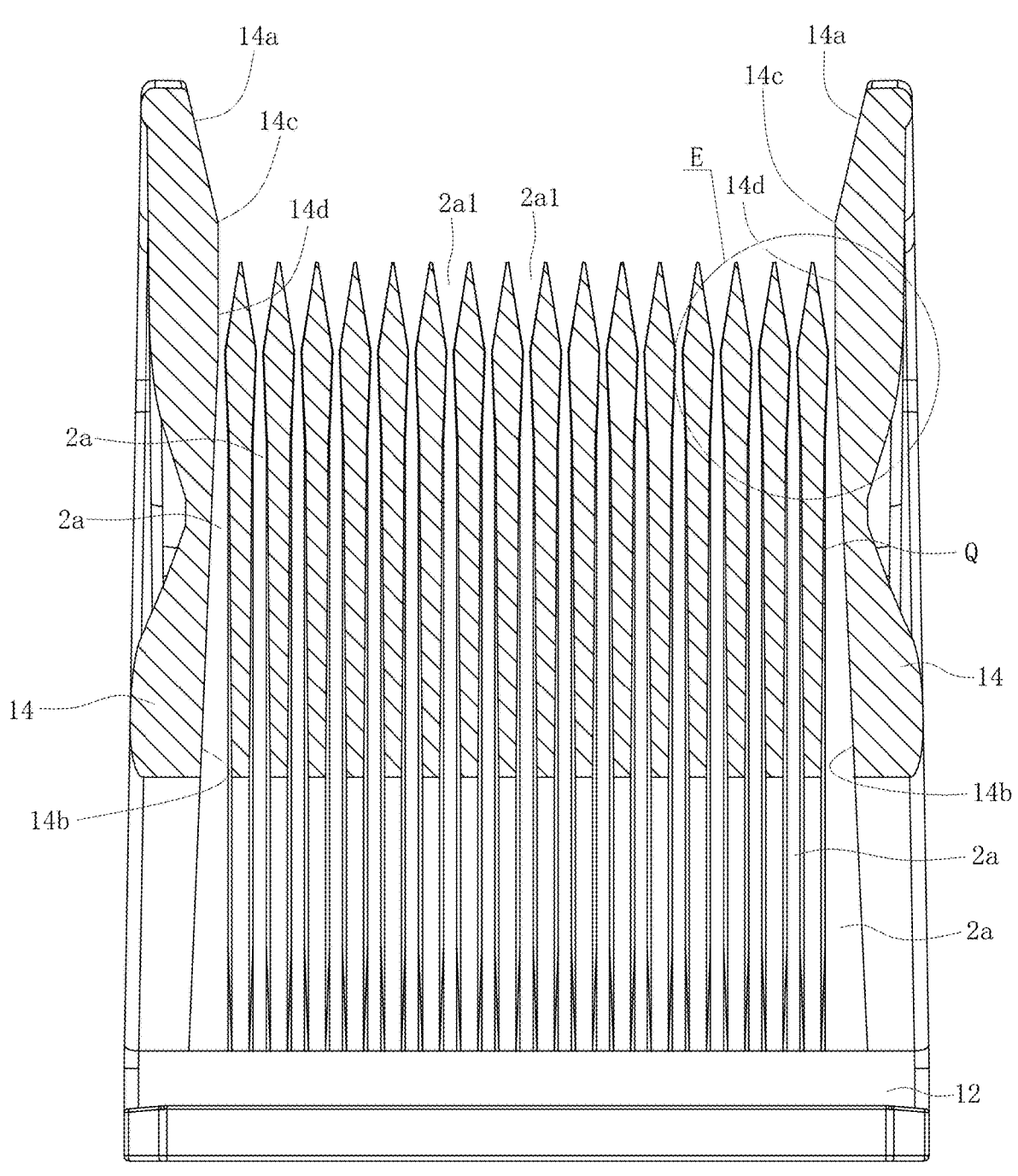
FIG. 22 is a sectional view taken along line GG of FIG. 16.
Figure 23:
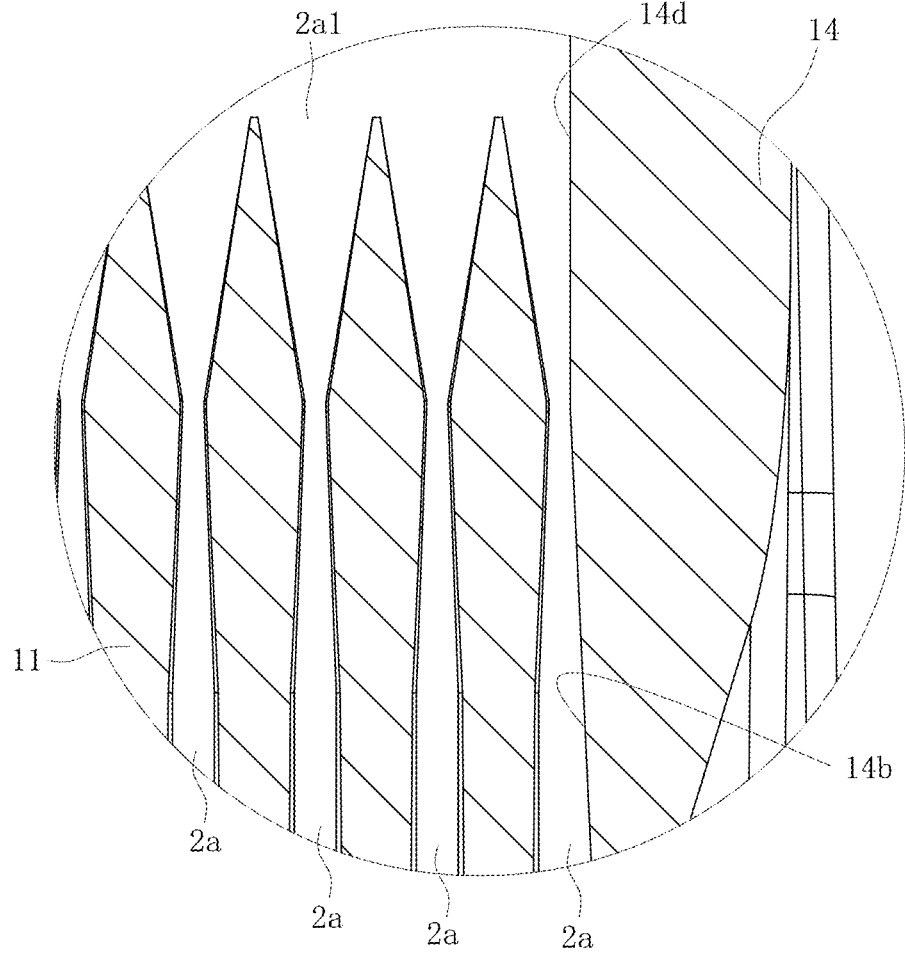
FIG. 23 is an enlarged view of area E in FIG. 22.

As shown in FIG. 21 to FIG. 23, the model 1 has a third improved structure.

Each of left and right sides of each side wall 11 of model 1 has a shielding column 14, and an upper inner side wall 14*a* of each shielding column 14 tilts outward and upward, and a lower inner side wall 14*b* of each shielding column tilts inward and upward. An upper end of each upper inner side wall 14*a* is located above the upper end notches 2*al* of the blade grooves 2*a*. The front and rear shielding columns 14 on the same side are connected together by a corresponding shielding wall 13.

A lower end of each upper inner wall 14*a* is connected to a corresponding lower inner wall 14*b* of the shielding column, and an intersection 14*c* of this upper inner wall 14*a* and this lower inner wall 14*b* is located above the upper end notches 2*al* of the first blade grooves 2*a*.

Alternatively, each upper inner wall 14*a* and a corresponding lower inner wall 14*b* are connected via a vertical guiding bevel 14*d*, and the intersection 14*c* of the upper inner wall 14*a* and the vertical guiding bevel 14*d* is located above the upper end notches 31 of the first blade grooves 2*a*.

When cutting meat, the outermost blades 33 on the left and right sides of the blade set 3 do not slide directly into the first blade grooves 3*a*, but first is transitioned and adjusted via the vertical guiding bevels 14*d* below the upper inner side walls 14*a*, and the sliding of the blades 33 on the left and right sides of the blade set 3 is adjusted from a inclined direction to an approximately vertical direction before continuing into the first blade grooves 3*a*. This prevents the outermost blades 33 on the left and right sides of the blade set 3 from directly sliding into the first blade grooves 3*a* along the inclined direction of the upper inner side wall 14*a*, thereby avoiding damage to the groove walls of the first blade grooves 3*a* by the outermost blades 33 on the left and right sides of the blade set 3 and preventing the resulted jamming phenomenon. To ensure the alignment of the blade set, and the aligned blades 33 of the blade set 3 correspond precisely to the first blade grooves 3*a*, allowing for smoother insertion. The lower inner side wall 14*b* of each shielding column 14 is inclined inward from bottom to top, giving the shielding column 14 a gradually converging shape from outside to inside. When the outermost blades 33 on the left and right sides of the blade set 3 slides into the first blade grooves 3*a*, the lower inner side walls 14*b* gradually converging from outside to inside exerts a force to press against the blades 33, preventing lateral movements of each blade 33 when entering the blade grooves 3, and helping to maintain a consistent cutting direction. As the lower inner side wall 14*b* of each shielding column 14 is inclined inward from bottom to top and forms a converging trend inwardly, the shielding column 14 has an inward elastic force. When the blades 33 exits the first blade groove 3*a*, the shielding column 14 may reset to its original position (with the left and right shielding columns moving closer to each other). This ensures that each blade 33 can be aligned and accurately enter the first blade groove 3*a* the next time, effectively preventing deformation of the shielding column 14 due to outward squeezing after long-term use, which could otherwise affect the alignment and entry of the blades 33 into the first blade grooves 3*a*.

It should be noted that in the description of the embodiments, the terms "front, back", "left, right", "inside, outside", "upper, lower" and the like indicating directions or positional relationships are all based on the directions or positional relationships shown in the accompanying drawings, and are only for the convenience of describing the present disclosure and simplifying the description, rather than indicating or implying that the device or element referred to must have a specific direction, be constructed and operated in a specific direction, and therefore cannot be understood as a limitation on the present disclosure. The terms "install", "connect", and "connected" should be understood in a broad sense, for example, it can be a fixed connection, a detachable connection, or an integral connection; it can be a direct connection, or an indirect connection through an intermediate medium, or it can be a connection between the insides of two elements. For those of ordinary skill in the art, the specific meanings of the above terms in the present disclosure can be understood according to specific circumstances.

What is claimed is:

1. A kitchen meat slicer, comprising a model for accommodating meat and a blade set, the model for accommodating meat comprising a placement cavity, the placement cavity having an open top and two opposing side walls, each of the two opposing side walls of the placement cavity being provided with a plurality of first blade grooves spaced apart, each of the plurality of first blade grooves having an upper end notch;

the blade set comprising:

a first blade holder comprising a first lower end surface and a plurality of first upper ribs extending upward from the first lower end surface and arranged at intervals along a left-to-right direction;

a second blade holder being capable of inserting with the first blade holder, and comprising a first upper end surface and a plurality of first lower ribs extending downward from the first upper end surface, wherein the plurality of first lower ribs is arranged at intervals along the left-to-right direction, each of the plurality of first lower ribs is inserted between two adjacent first upper ribs of the plurality of first upper ribs to realize insertion of the first blade holder and the second blade holder;

a first connecting block comprising a second lower end surface and a plurality of second upper ribs extending upward from the second lower end surface and arranged at intervals along the left-to-right direction;

a second connecting block comprising a second upper end surface and a plurality of second lower ribs extending downward from the second upper end surface and arranged at intervals along the left-to-right direction, wherein each of the plurality of second upper ribs is inserted between two adjacent second lower ribs of the plurality of second lower ribs to realize insertion of the first connecting block and the second connecting block;

a plurality of first blades arranged parallel to each other at intervals and each first blade comprising a proximal end fixed on a corresponding one of the plurality of first upper ribs of the first blade holder and a distal end opposite to the proximal end and fixed on a corresponding one of the plurality of second upper ribs;

a plurality of second blades arranged parallel to each other at intervals and each second blade comprising a second proximal end fixed on a corresponding one of the plurality of first lower ribs and a second distal end opposite to the second proximal end and fixed on a corresponding one of the plurality of second lower ribs; and wherein, when the first blade holder and the second blade holder are inserted with each other, the first blades and the second blades are inserted with each other so that the first blades and the second blades are parallel to each other in a thickness direction of the first blades and the second blades; and the first blade holder connected to a handle, wherein the blade set is symmetrical about a central axis in a longitudinal direction of the handle, and blade edges of the first blades and the second blades are at the same height.

2. The kitchen meat slicer according to claim 1, wherein a first blade spacing is formed between two adjacent first blades of the first blades, the first blade spacing is arranged with a corresponding one of the second blades, and a second blade spacing is formed between one of the second blades and one adjacent first blade of the first blades.

3. The kitchen meat slicer according to claim 1, wherein the blade edges of the first blades and the second blades are arranged to face away from the first lower end surface and the second lower end surface respectively, the handle is fixed to the first blade holder, each of the first blades is inserted into and integrally molded with the first blade holder and the first connecting block, and each of the second blades is inserted into and integrally molded with the second blade holder and the second connecting block.

4. The kitchen meat slicer according to claim 1, wherein the first blade holder and the second blade holder are locked by a locking structure, the locking structure comprises a locking block restricted in the handle and the locking block is capable of sliding along the longitudinal direction of the handle, the second blade holder has a locking hook matching with the locking block, and the locking block is capable of moving toward the locking hook to allow the locking block to be locked with the locking hook in response to the first blade holder and the second blade holder being inserted into each other.

5. The kitchen meat slicer according to claim 4, wherein the first connecting block has an outer wall defined with a plurality of holes; a front end of the second connecting block has a plurality of posts; each of the plurality of posts is inserted into a corresponding one of the plurality of holes in response to the first connecting block and the second connecting block being inserted into each other.

6. The kitchen meat slicer according to claim 1, further comprising a base, wherein a bottom of the base is provided with a suction cup for adhering to a table, and the model is detachably mounted on the base.

7. The kitchen meat slicer according to claim 6, wherein a top of the base is defined with a slot extending along the left-to-right direction, and a bottom of the model is provided with an insertion strip; or, the top of the base is provided with the insertion strip extending along the left-to-right direction, and the bottom of the model is provided with the slot; and the insertion strip is capable of be inserted into the slot to fix the model on the base.

8. The kitchen meat slicer according to claim 6, further comprising a suction cup knob for controlling the suction cup.

9. A kitchen meat slicer, comprising a model for accommodating meat and a blade set, the model for accommodating meat comprising a placement cavity, the placement cavity having an open top and two opposing side walls, each of the two opposing side walls of the placement cavity being provided with a plurality of first blade grooves spaced apart, each of the plurality of first blade grooves having an upper end notch, two opposing first side surfaces of each of the plurality of first blade grooves being inclined surfaces approaching a horizontal central line of each of the plurality of first blade grooves from an outside of the placement cavity to an inside of the placement cavity;

the blade set comprising: a handle, a blade holder connected to the handle, and a plurality of blades arranged side by side at intervals; a proximal end of each of the plurality of blades being fixed to the blade holder; a distal end of each of the plurality of blades being fixed to a connecting block; the handle being capable of driving the plurality of blades to slide back and forth for cutting; each of the plurality of blades being capable of entering the upper end notch of one of the plurality of first blade grooves and cutting meat placed in the placement cavity;

the blade holder comprises a first blade holder and a second blade holder, the connecting block comprises a first connecting block and a second connecting block, the plurality of blades comprises first blades and second blades, the proximal ends of the first blades are fixed on the first blade holder, the distal ends of the first blades are fixed on the first connecting block, the proximal ends the second blades are fixed on the second blade holder, and the distal ends of the second blades are fixed on the second connecting block;

the first blade holder and the second blade holder of the blade holder are inserted into each other, the first connecting block and the second connecting block are inserted into each other, a first blade spacing is formed between two adjacent first blades of the first blades, the first blade spacing is arranged with one of the second blades, and a second blade spacing is formed between one of the second blades and one adjacent first blade of the first blades; and the first blade holder and the second blade holder are locked by a locking structure, the locking structure comprises a locking block restricted in the handle and the locking block is capable of sliding along a longitudinal direction of the handle, the second blade holder has a locking hook matching with the locking block, and the locking block is capable of moving toward the locking hook to allow the locking block to be locked with the locking hook in response to the first blade holder and the second blade holder being inserted into each other.

10. A kitchen meat slicer, comprising:

a model for accommodating meat; and a blade set, the model for accommodating meat comprising a placement cavity, the placement cavity having an open top and two opposing side walls, each of the two opposing side walls of the placement cavity being provided with a plurality of first blade grooves spaced apart, each of the plurality of first blade grooves having an upper end notch;

wherein the blade set comprises a handle, a blade holder connected to the handle, and a plurality of blades arranged side by side at intervals; a proximal end of each of the plurality of blades being fixed to the blade holder; a distal end of each of the plurality of blades being fixed to a connecting block; the handle being capable of driving the plurality of blades to slide back and forth for cutting; each of the plurality of blades being capable of entering the upper end notch of one of the plurality of first blade grooves and cutting meat placed in the placement cavity;

wherein the blade holder comprises a first blade holder and a second blade holder, the connecting block comprises a first connecting block and a second connecting block, the plurality of blades comprises first blades and second blades, the proximal ends of the first blades are fixed on the first blade holder, the distal ends of the first blades are fixed on the first connecting block, the proximal ends of the second blades are fixed on the second blade holder, and the distal ends of the second blades are fixed on the second connecting block;

wherein the first blade holder and the second blade holder are inserted into each other, the first connecting block and the second connecting block are inserted into each other, a first blade spacing is formed between two adjacent first blades of the first blades, the first blade spacing is arranged with a corresponding one of the second blades, and a second blade spacing is formed between one of the second blades and one adjacent first blade of the first blades;

wherein the first blade holder and the second blade holder are locked by a locking structure, the locking structure comprises a locking block restricted in the handle and the locking block is capable of sliding along a longitudinal direction of the handle, the second blade holder has a locking hook matching with the locking block, and the locking block is capable of moving toward the locking hook to allow the locking block to be locked with the locking hook in response to the first blade holder and the second blade holder being inserted into each other.

11. A kitchen meat slicer, comprising:

a model for accommodating meat; and a blade set, the model for accommodating meat comprising a placement cavity, the placement cavity having an open top and two opposing side walls, each of the two opposing side walls of the placement cavity being provided with a plurality of first blade grooves spaced apart, each of the plurality of first blade grooves having an upper end notch;

wherein the blade set comprises a handle, a blade holder connected to the handle, and a plurality of blades arranged side by side at intervals; a proximal end of each of the plurality of blades being fixed to the blade holder; a distal end of each of the plurality of blades being fixed to a connecting block; the handle being capable of driving the plurality of blades to slide back and forth for cutting; each of the plurality of blades being capable of entering the upper end notch of one of the plurality of first blade grooves and cutting meat placed in the placement cavity;

wherein the blade holder comprises a first blade holder and a second blade holder, the connecting block comprises a first connecting block and a second connecting block, the plurality of blades comprises first blades and second blades, the proximal ends of the first blades are fixed on the first blade holder, the distal ends of the first blades are fixed on the first connecting block, the proximal ends of the second blades are fixed on the second blade holder, and the distal ends of the second blades are fixed on the second connecting block;

wherein the first blade holder and the second blade holder are inserted into each other, the first connecting block and the second connecting block are inserted into each other, a first blade spacing is formed between two adjacent first blades of the first blades, the first blade spacing is arranged with a corresponding one of the second blades, and a second blade spacing is formed between one of the second blades and one adjacent first blade of the first blades;

wherein the first connecting block has an outer wall defined with a plurality of holes; a front end of the second connecting block has a plurality of posts; each of the plurality of posts is inserted into a corresponding one of the plurality of holes in response to the first connecting block and the second connecting block being inserted into each other.

* * * * *